(12) United States Patent
Ebtekar et al.

(10) Patent No.: US 10,708,342 B2
(45) Date of Patent: Jul. 7, 2020

(54) DYNAMIC TROUBLESHOOTING WORKSPACES FOR CLOUD AND NETWORK MANAGEMENT SYSTEMS

(71) Applicant: Cisco Technology, Inc., San Jose, CA (US)

(72) Inventors: Ali Ebtekar, Palo Alto, CA (US); Daniel Robert Garrison, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 485 days.

(21) Appl. No.: 14/798,355

(22) Filed: Jul. 13, 2015

(65) Prior Publication Data
US 2016/0254968 A1    Sep. 1, 2016

Related U.S. Application Data

(63) Continuation-in-part of application No. 14/732,995, filed on Jun. 8, 2015.
(Continued)

(51) Int. Cl.
*H04L 12/26* (2006.01)
*H04L 29/08* (2006.01)
*H04L 12/24* (2006.01)

(52) U.S. Cl.
CPC .............. *H04L 67/10* (2013.01); *H04L 41/12* (2013.01); *H04L 41/22* (2013.01); *H04L 67/1097* (2013.01); *H04L 67/2842* (2013.01)

(58) Field of Classification Search
CPC .............. G06F 3/04847; G06F 3/0482; G06F 3/04842; G06F 3/04845; G06T 11/206
See application file for complete search history.

(56) References Cited

U.S. PATENT DOCUMENTS 5,504,921 A * 4/1996 Dev ................... G06F 11/2257
                                                    709/223
5,812,773 A   9/1998 Norin
(Continued)

FOREIGN PATENT DOCUMENTS

CN    101719930    6/2010
CN    101394360    7/2011
(Continued)

OTHER PUBLICATIONS

Amedro, Brian, et al., "An Efficient Framework for Running Applications on Clusters, Grids and Cloud," 2010, 17 pages.
(Continued)

*Primary Examiner* — Anil K Bhargava
(74) *Attorney, Agent, or Firm* — Polsinelli PC

(57) ABSTRACT

Systems, methods, and computer-readable media for dynamic troubleshooting workspaces. A system can collect network statistics for a network and, based on the statistics, present a first workspace having a first set of interface components, each of the first set of interface components representing a respective network context, and each of the first set of interface components including a first set of objects associated with the respective network context. Next, the system can associate selected interface components from the first set of interface components to yield associated interface components, and dynamically present a second workspace having a second set of interface components selected based on the associated interface components, each of the second set of interface components representing a different respective network context related to the associated interface components, and each of the second set of interface components including a second set of objects associated with the different respective network context.

17 Claims, 16 Drawing Sheets

Related U.S. Application Data

(60) Provisional application No. 62/126,014, filed on Feb. 27, 2015, provisional application No. 62/121,999, filed on Feb. 27, 2015.

(56) References Cited

U.S. PATENT DOCUMENTS

| | | | |
|---|---|---|---|
| 5,889,896 | A | 3/1999 | Meshinsky et al. |
| 6,108,782 | A | 8/2000 | Fletcher et al. |
| 6,178,453 | B1 | 1/2001 | Mattaway et al. |
| 6,298,153 | B1 | 10/2001 | Oishi |
| 6,343,290 | B1* | 1/2002 | Cossins ............... H04L 41/0253 |
| 6,643,260 | B1 | 11/2003 | Kloth et al. |
| 6,683,873 | B1 | 1/2004 | Kwok et al. |
| 6,721,804 | B1 | 4/2004 | Rubin et al. |
| 6,733,449 | B1 | 5/2004 | Krishnamurthy et al. |
| 6,735,631 | B1 | 5/2004 | Oehrke et al. |
| 6,996,615 | B1 | 2/2006 | McGuire |
| 7,054,930 | B1 | 5/2006 | Cheriton |
| 7,058,706 | B1 | 6/2006 | Lyer et al. |
| 7,062,571 | B1 | 6/2006 | Dale et al. |
| 7,111,177 | B1 | 9/2006 | Chauvel et al. |
| 7,212,490 | B1 | 5/2007 | Kao et al. |
| 7,277,948 | B2 | 10/2007 | Igarashi et al. |
| 7,313,667 | B1 | 12/2007 | Pullela et al. |
| 7,379,846 | B1 | 5/2008 | Williams et al. |
| 7,480,672 | B2 | 1/2009 | Hahn et al. |
| 7,496,043 | B1 | 2/2009 | Leong et al. |
| 7,536,476 | B1 | 5/2009 | Alleyne |
| 7,567,504 | B2 | 7/2009 | Darling et al. |
| 7,606,147 | B2 | 10/2009 | Luft et al. |
| 7,647,594 | B2 | 1/2010 | Togawa |
| 7,773,510 | B2 | 8/2010 | Back et al. |
| 7,808,897 | B1 | 10/2010 | Mehta et al. |
| 7,881,957 | B1 | 2/2011 | Cohen et al. |
| 7,917,647 | B2 | 3/2011 | Cooper et al. |
| 8,010,598 | B2 | 8/2011 | Tanimoto |
| 8,028,071 | B1 | 9/2011 | Mahalingam et al. |
| 8,041,714 | B2 | 10/2011 | Aymeloglu et al. |
| 8,121,117 | B1 | 2/2012 | Amdahl et al. |
| 8,171,415 | B2 | 5/2012 | Appleyard et al. |
| 8,234,377 | B2 | 7/2012 | Cohn |
| 8,244,559 | B2 | 8/2012 | Horvitz et al. |
| 8,250,215 | B2 | 8/2012 | Stienhans et al. |
| 8,280,880 | B1 | 10/2012 | Aymeloglu et al. |
| 8,284,664 | B1 | 10/2012 | Aybay et al. |
| 8,301,746 | B2 | 10/2012 | Head et al. |
| 8,345,692 | B2 | 1/2013 | Smith |
| 8,406,141 | B1 | 3/2013 | Couturier et al. |
| 8,407,413 | B1 | 3/2013 | Yucel et al. |
| 8,448,171 | B2 | 5/2013 | Donnellan et al. |
| 8,477,610 | B2 | 7/2013 | Zuo et al. |
| 8,495,356 | B2 | 7/2013 | Ashok et al. |
| 8,510,469 | B2 | 8/2013 | Portolani |
| 8,514,868 | B2 | 8/2013 | Hill |
| 8,532,108 | B2 | 9/2013 | Li et al. |
| 8,533,687 | B1 | 9/2013 | Greifeneder et al. |
| 8,547,974 | B1 | 10/2013 | Guruswamy et al. |
| 8,560,639 | B2 | 10/2013 | Murphy et al. |
| 8,560,663 | B2 | 10/2013 | Baucke et al. |
| 8,589,543 | B2 | 11/2013 | Dutta et al. |
| 8,590,050 | B2 | 11/2013 | Nagpal et al. |
| 8,611,356 | B2 | 12/2013 | Yu et al. |
| 8,612,625 | B2 | 12/2013 | Andreis et al. |
| 8,630,291 | B2 | 1/2014 | Shaffer et al. |
| 8,639,787 | B2 | 1/2014 | Lagergren et al. |
| 8,656,024 | B2 | 2/2014 | Krishnan et al. |
| 8,660,129 | B1 | 2/2014 | Brendel et al. |
| 8,719,804 | B2 | 5/2014 | Jain |
| 8,775,576 | B2 | 7/2014 | Hebert et al. |
| 8,797,867 | B1 | 8/2014 | Chen et al. |
| 8,805,951 | B1 | 8/2014 | Faibish et al. |
| 8,850,182 | B1 | 9/2014 | Fritz et al. |
| 8,856,339 | B2 | 10/2014 | Mestery et al. |
| 8,909,928 | B2 | 12/2014 | Ahmad et al. |
| 8,918,510 | B2 | 12/2014 | Gmach et al. |
| 8,924,720 | B2 | 12/2014 | Raghuram et al. |
| 8,930,747 | B2 | 1/2015 | Levijarvi et al. |
| 8,938,775 | B1 | 1/2015 | Roth et al. |
| 8,959,526 | B2 | 2/2015 | Kansal et al. |
| 8,977,754 | B2 | 3/2015 | Curry, Jr. et al. |
| 9,009,697 | B2 | 4/2015 | Breiter et al. |
| 9,015,324 | B2 | 4/2015 | Jackson |
| 9,043,439 | B2 | 5/2015 | Bicket et al. |
| 9,049,115 | B2 | 6/2015 | Rajendran et al. |
| 9,063,789 | B2 | 6/2015 | Beaty et al. |
| 9,065,727 | B1 | 6/2015 | Liu et al. |
| 9,075,649 | B1 | 7/2015 | Bushman et al. |
| 9,164,795 | B1 | 10/2015 | Vincent |
| 9,167,050 | B2 | 10/2015 | Durazzo et al. |
| 9,201,701 | B2 | 12/2015 | Boldyrev et al. |
| 9,201,704 | B2 | 12/2015 | Chang et al. |
| 9,203,784 | B2 | 12/2015 | Chang et al. |
| 9,223,634 | B2 | 12/2015 | Chang et al. |
| 9,244,776 | B2 | 1/2016 | Koza et al. |
| 9,251,114 | B1 | 2/2016 | Ancin et al. |
| 9,264,478 | B2 | 2/2016 | Hon et al. |
| 9,313,048 | B2 | 4/2016 | Chang et al. |
| 9,361,192 | B2 | 6/2016 | Smith et al. |
| 9,380,075 | B2 | 6/2016 | He et al. |
| 9,432,294 | B1 | 8/2016 | Sharma et al. |
| 9,444,744 | B1 | 9/2016 | Sharma et al. |
| 9,473,365 | B2 | 10/2016 | Melander et al. |
| 9,503,530 | B1 | 11/2016 | Niedzielski |
| 9,558,078 | B2 | 1/2017 | Farlee et al. |
| 9,613,078 | B2 | 4/2017 | Vermeulen et al. |
| 9,628,471 | B1 | 4/2017 | Sundaram et al. |
| 9,658,876 | B2 | 5/2017 | Chang et al. |
| 9,692,802 | B2 | 6/2017 | Bicket et al. |
| 9,755,858 | B2 | 9/2017 | Bagepalli et al. |
| 2002/0073337 | A1 | 6/2002 | Ioele et al. |
| 2002/0143928 | A1 | 10/2002 | Maltz et al. |
| 2002/0166117 | A1* | 11/2002 | Abrams ............... G06Q 20/145 717/177 |
| 2002/0174216 | A1 | 11/2002 | Shorey et al. |
| 2003/0018591 | A1 | 1/2003 | Komisky |
| 2003/0056001 | A1 | 3/2003 | Mate et al. |
| 2003/0228585 | A1 | 12/2003 | Inoko et al. |
| 2004/0004941 | A1 | 1/2004 | Malan et al. |
| 2004/0095237 | A1 | 5/2004 | Chen et al. |
| 2004/0131059 | A1 | 7/2004 | Ayyakad et al. |
| 2004/0264481 | A1 | 12/2004 | Darling et al. |
| 2005/0004945 | A1* | 1/2005 | Cossins ............... H04L 41/0253 |
| 2005/0060418 | A1 | 3/2005 | Sorokopud |
| 2005/0125424 | A1 | 6/2005 | Herriott et al. |
| 2006/0104286 | A1 | 5/2006 | Cheriton |
| 2006/0126665 | A1 | 6/2006 | Ward et al. |
| 2006/0146825 | A1 | 7/2006 | Hofstaedter et al. |
| 2006/0155875 | A1 | 7/2006 | Cheriton |
| 2006/0168338 | A1 | 7/2006 | Bruegl et al. |
| 2007/0174663 | A1 | 7/2007 | Crawford et al. |
| 2007/0223487 | A1 | 9/2007 | Kajekar et al. |
| 2007/0242830 | A1 | 10/2007 | Conrado et al. |
| 2008/0005293 | A1 | 1/2008 | Bhargava et al. |
| 2008/0084880 | A1 | 4/2008 | Dharwadkar |
| 2008/0165778 | A1 | 7/2008 | Ertemalp |
| 2008/0198752 | A1 | 8/2008 | Fan et al. |
| 2008/0201711 | A1 | 8/2008 | Amir Husain |
| 2008/0235755 | A1 | 9/2008 | Blaisdell et al. |
| 2009/0006527 | A1 | 1/2009 | Gingell, Jr. et al. |
| 2009/0019367 | A1 | 1/2009 | Cavagnari et al. |
| 2009/0031312 | A1 | 1/2009 | Mausolf et al. |
| 2009/0083183 | A1 | 3/2009 | Rao et al. |
| 2009/0138763 | A1 | 5/2009 | Arnold |
| 2009/0177775 | A1 | 7/2009 | Radia et al. |
| 2009/0178058 | A1 | 7/2009 | Stillwell, III et al. |
| 2009/0182874 | A1 | 7/2009 | Morford et al. |
| 2009/0265468 | A1 | 10/2009 | Annambhotla et al. |
| 2009/0265753 | A1 | 10/2009 | Anderson et al. |
| 2009/0293056 | A1 | 11/2009 | Ferris |
| 2009/0300608 | A1 | 12/2009 | Ferris et al. |
| 2009/0313562 | A1* | 12/2009 | Appleyard ............... H04L 41/22 715/764 |
| 2009/0323706 | A1 | 12/2009 | Germain et al. |

(56) References Cited

U.S. PATENT DOCUMENTS

| | | |
|---|---|---|
| 2009/0328031 A1 | 12/2009 | Pouyadou et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1* | 10/2011 | Awasthi ............. H04L 43/045 715/736 |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1* | 4/2012 | Suit ............. G06F 9/5072 709/221 |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1* | 7/2012 | Gotesdyner ......... H04L 12/6418 714/47.3 |
| 2012/0192075 A1* | 7/2012 | Ebtekar ............. H04L 12/6418 715/738 |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1* | 8/2013 | Zalmanovitch ....... H04L 43/062 709/224 |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |

(56) References Cited

U.S. PATENT DOCUMENTS

| | | |
|---|---|---|
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0297569 A1* | 10/2014 | Clark ............ G06Q 10/00 706/11 |
| 2014/0297835 A1 | 10/2014 | Buys |
| 2014/0310605 A1* | 10/2014 | Basile ............ H04L 41/22 715/736 |
| 2014/0314078 A1 | 10/2014 | Jilani |
| 2014/0317261 A1 | 10/2014 | Shatzkamer et al. |
| 2014/0366155 A1 | 12/2014 | Chang et al. |
| 2014/0372567 A1 | 12/2014 | Ganesh et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0100471 A1 | 4/2015 | Curry, Jr. et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0178133 A1 | 6/2015 | Phelan et al. |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0062786 A1 | 3/2016 | Meng et al. |
| 2016/0094398 A1 | 3/2016 | Choudhury et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0164914 A1 | 6/2016 | Madhav et al. |
| 2016/0182327 A1* | 6/2016 | Coleman, Jr. ........ H04L 43/103 370/329 |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1* | 5/2017 | Krishnamurthy ........ G06F 8/71 |
| 2017/0171158 A1 | 6/2017 | Hoy et al. |
| 2017/0264663 A1 | 9/2017 | Bicket et al. |
| 2017/0339070 A1 | 11/2017 | Chang et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Kunz, Thomas, et al., "OmniCloud—The Secure and Flexible Use of Cloud Storage Services," 2014, 30 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Mu, Shuai, et al., "uLibCloud: Providing High Available and Uniform Accessing to Multiple Cloud Storages," 2012 IEEE, 8 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.

(56) References Cited

OTHER PUBLICATIONS

Von Laszewski, Gregor, et al., "Design of a Dynamic Provisioning System for a Federated Cloud and Bare-metal Environment," 2012, 8 pages.
Ye, Xianglong, et al., "A Novel Blocks Placement Strategy for Hadoop," 2012 IEEE/ACTS 11$^{th}$ International Conference on Computer and Information Science, 2012 IEEE, 5 pages.
Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-qateway-in-the-cloud.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Beyer, Steffen, "Module "Data::Locations?!"," YAPC::Europe, London, UK,ICA, Sep. 22-24, 2000, XP002742700, 15 pages.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-qateway.php.
Fang K., "LISP MAC-EID-TO-RLOC Mapping (LISP based L2VPN)," Network Working Group, Internet Draft, Cisco Systems, Jan. 2012, 12 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television " http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.

* cited by examiner

500

524 {
- Design
- Deploy
- Manage

| CUSTOMER | REGION | SITE |
|---|---|---|
| Java Cafe ▾ | San Francisco ▾ | Mission St ▾ |
| 1 of 28 | 1 of 5 | 1 of 3 |

502 — CUSTOMER
504 — REGION
506 — SITE
508 — (map)
510

512 — Incidents
1 New Incident
VPN Connectivity issue
Some users may have lost connectivity 522 — Site Information
Connectivity issue
Small Retail Branch
Added on January 2, 2014
Changed on May 23, 2014
Java Cafe
Mission & 4th
680 Mission Street
San Francisco 98103
USA
Jane Smith
Technical Contact Account
English
Log Out 514 — Services
CloudVPN Full
98 AVAILABILITY  49.6 MAX SPEED  5 MAX USERS
99.9 %           50 Mbps        30
IP VPN
Firewall
Remote Access
Enhanced Web Security

516

518 — Devices at Location
cisco-isr
TRAFFIC

Servers
Open incident
cisco-ucs
CPU     31%
MEMORY  45%
STORAGE 17%

520 — Active VMs
1 Failed
vm-csr
vm-asa
vm-wsa

DYNAMIC TROUBLESHOOTING WORKSPACES FOR CLOUD AND NETWORK MANAGEMENT SYSTEMS

CROSS-REFERENCE TO RELATED APPLICATIONS

This application is a continuation in part of U.S. Non-Provisional patent application Ser. No. 14/732,995, filed on Jun. 8, 2015, and claims the benefit of priority of U.S. Provisional Patent Application Ser. No. 62/126,014, filed on Feb. 27, 2015 and U.S. Provisional Patent Application Ser. No. 62/121,999, filed on Feb. 27, 2015; all of which are incorporated herein by reference in their entirety.

TECHNICAL FIELD

The present technology pertains to networking tools, and more specifically to network visualization tools and graphical user interfaces for dynamic network troubleshooting.

BACKGROUND

Traditional network troubleshooting and diagnostic tools are typically confined to fixed decision trees or a predefined set of workspaces. These tools do not adequately represent today's dynamic and complex networks, and further limit users to static problem-solving patterns. Consequently, users are forced into fixed, narrow troubleshooting methods that are mapped to a deterministic system structure. Yet users instead need flexible and adaptive tools to better monitor and manage today's dynamic and complex networks. As a result, conventional tools greatly limit the user's ability to quickly and efficiently manage network resources.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5A-B illustrate a diagram of workspaces for dynamic troubleshooting a network in accordance with an example embodiment;

DESCRIPTION OF EXAMPLE EMBODIMENTS

Figure 1:
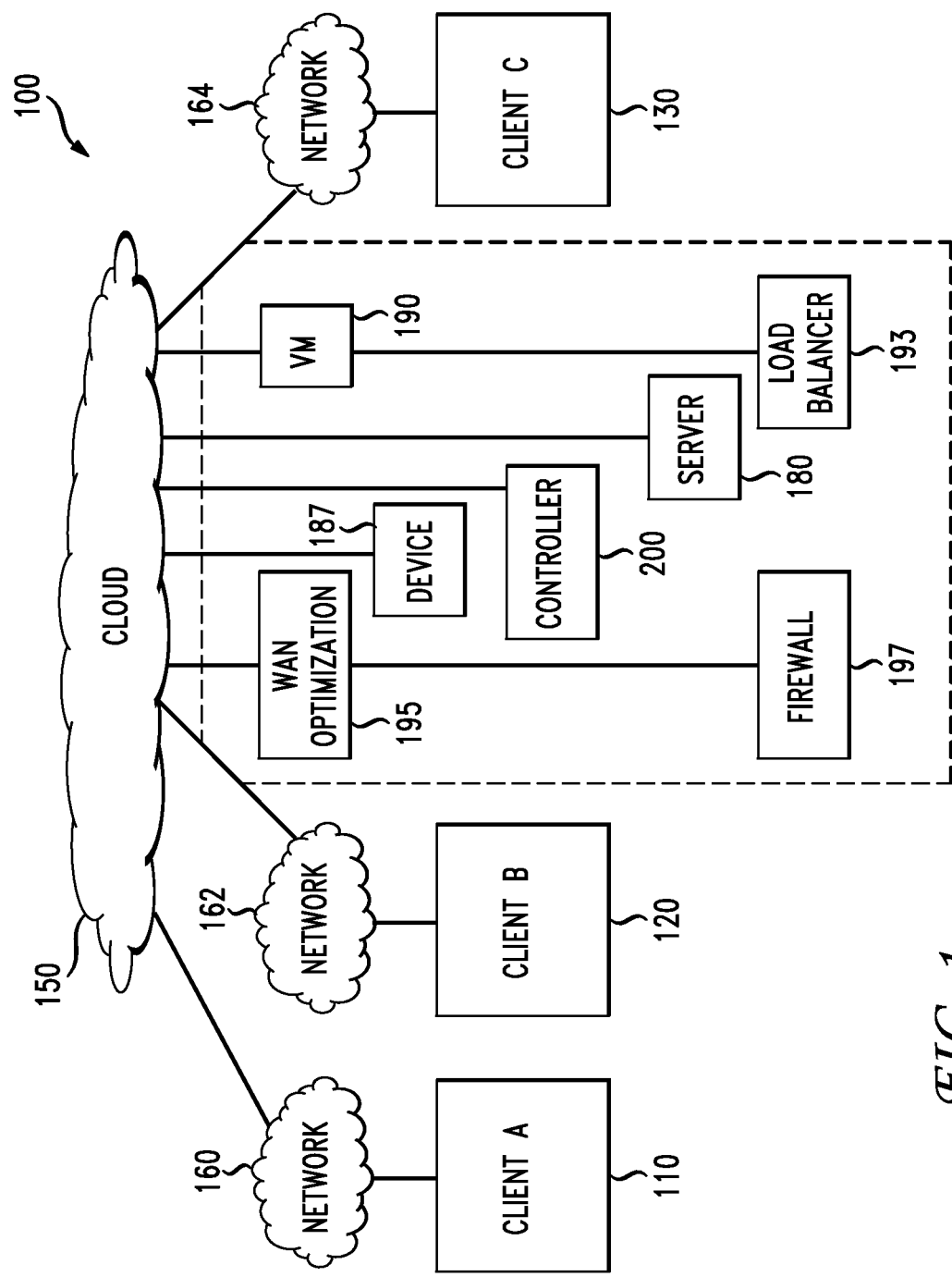
FIG. 1 illustrates a schematic block diagram of an example cloud architecture including nodes/devices interconnected by various methods of communication.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to generate a dynamic troubleshooting workspace that allows users to generate a custom and desired workflow(s) for investigating and resolving a given network scenario or issue. The dynamic troubleshooting workspace can be a context-aware mechanism that allows users to connect two or more informational user interface components in an implicitly or explicitly defined order to form a transient or persistent diagnostics and data analysis workspace. The connectable components can be smart tiles, or any self-contained informational views with system-level relationships between and among one another.

The structure and context for the dynamic troubleshooting workspace can be dynamically defined by a user action, which can propagate through the underlying system-level semantics and data in order to render the corresponding workspace. The user action can be an expressed linkage between two or more connectable components, thereby dynamically presenting the user with a contained workspace in which to further explore relationships between two or more views and their contained objects. The user can also continue to add or link connectable components into this dynamic workspace as desired in order to facilitate a real-time and evolving troubleshooting intent and path through the system. As these additional linkages are established, the relationships between the components within the workspace can be illustrated and made available for additional exploration and investigation by the user.

The instantiation of the dynamic workspace view can also occur as a result of application-level context and logic. Here, the system can establish the connections implicitly on behalf of the user in order to elucidate particular object connections and relationships that are likely to be of interest given the current detected state of the system components. If the workspace is generated as a transient area or view, as opposed to a persistent one, the system can provide a user interface navigation affordance to close or exit the dynamic workspace view.

Disclosed are systems, methods, and computer-readable storage media for dynamic troubleshooting workspaces. A system can collect network statistics for a network and, based on the network statistics, present a first workspace having a first set of interface components. For example, the system can collect network statistics and use the network statistics to generate a graphical user interface (GUI) displaying the first workspace with the first set of interface components. Each of the first set of interface components can be an informational view of one or more network elements, which can include servers, virtual machines (VMs), services, event logs, parameters, topologies, events, semantics, locations, and so forth. The first set of interface components can contain respective network objects, such as services, servers, devices, VMs, events (e.g., incidents, errors, status changes, conditions, security events, etc.), physical or logical segments or locations, event logs, topologies, connections, and so forth.

In some embodiments, the interface components can be tiles. Thus, the first workspace can include a set of tiles or tile clusters. Each of the tiles can contain similar or related network objects, such as servers, VMs, services, events, topology, event logs, etc. For example, if the first workspace is created for a branch network, the tiles can represent devices, events, services, and topologies associated with the branch network, and the objects contained within the tiles can represent specific devices, events, services, or topologies.

In some embodiments, the number of interface components included in the first workspace can vary based on the network statistics, user input, system instructions, and so forth. For example, the number of interface components can be selected, increased, decreased or modified by a user. In some cases, a user can limit the number of interface components presented in the first workspace to focus on a fewer, more relevant interface components.

Next, the system can associate interface components from the first set of interface components to yield a network context that is based on a relationship between the associated interface components. For example, the system can link, connect, or associate an interface component representing servers in the network with another interface component representing incidents in the network. This association between interface components can create a relationship between the associated interface components which can represent a network context. In the above example, the network context could be servers and incidents, based on the relationship or association between the servers component and the incidents component. This network context can be used to create a new workspace, as further detailed below, which can include interface objects related or relevant to the network context (servers and incidents).

In some cases, the system can associate the selected interface components based on a user input or a system instructions. For example, a user can click or select a first interface component and a second interface component to create a link, connection, or association between the two selected interface components. In some embodiments, such link, connection, or association can be visual or graphical. For example, the system can display a line or object connecting the first selected interface component with a second one. In some embodiments, the system can also connect, link, or associate an object within a component with one or more objects within a second component, or a component with one or more objects within another component. For example, the system can link a component representing network incidents with a VPN service object within a network services component to create a relationship—and thus a network context—based on incidents in the network and a VPN service in the network.

The system can then dynamically present a second workspace including a second set of interface components. The system can present and/or generate the second workspace dynamically in response to the associated interface components and/or based on the network context. For example, if a services interface component is linked to an incidents interface component, the system can dynamically generate the second workspace based on the services and incidents represented by the connected interface components.

The second set of interface components can represent services, servers, incidents, events, appliances, VMs, logs, devices, locations, users, etc. Moreover, each of the second set of interface components can be based on the network context. For example, if the network context is services and incidents, the second set of interface components can be associated with the network services and/or incidents. To illustrate, assuming the second set of interface components includes servers and VMs interface components, such servers and VMs interface components can be associated with the network services and/or incidents represented by the associated interface components. For example, the servers interface component can represent servers provisioning the network services and/or having any of the incidents, and the VMs interface component can similarly represent VMs running the network services and/or having any of the incidents.

Further, each of the second set of interface components can contain one or more network objects. The network objects can be related or relevant to the respective interface components. For example, if an interface component represents servers, the objects can represent servers, server statistics, server status information, server events, server configurations, server conditions, and/or otherwise be associated with the servers. In some embodiments, the network objects can be graphical elements representing the objects. For example, the network objects can be visual representations of servers, devices, network models, service models, VMs, events, etc.

DESCRIPTION

A computer network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a public WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by intermediate network nodes, such as routers, switches, hubs, or access points, which can effectively extend the size or footprint of the network.

Networks can be segmented into subnetworks to provide a hierarchical, multilevel routing structure. For example, a network can be segmented into subnetworks using subnet addressing to create network segments. This way, a network can allocate various groups of IP addresses to specific network segments and divide the network into multiple logical networks.

In addition, networks can be divided into logical segments called virtual networks, such as VLANs, which connect logical segments. For example, one or more LANs can be logically segmented to form a VLAN. A VLAN allows a group of machines to communicate as if they were in the same physical network, regardless of their actual physical location. Thus, machines located on different physical LANs can communicate as if they were located on the same physical LAN. Interconnections between networks and devices can also be created using routers and tunnels, such as VPN tunnels. Tunnels can encrypt point-to-point logical connections across an intermediate network, such as a public network like the Internet. This allows secure communications between the logical connections and across the intermediate network. By interconnecting networks, the number and geographic scope of machines interconnected, as well as the amount of data, resources, and services available to users can be increased.

Further, networks can be extended through network virtualization. Network virtualization allows hardware and software resources to be combined in a virtual network. For example, network virtualization can allow multiple numbers of VMs to be attached to the physical network via respective VLANs. The VMs can be grouped according to their respective VLAN, and can communicate with other VMs as well as other devices on the internal or external network.

To illustrate, overlay and software defined networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Networks can include various hardware or software appliances or nodes to support data communications, security, and provision services. For example, networks can include routers, hubs, switches, APs, firewalls, repeaters, intrusion detectors, servers, VMs, load balancers, application delivery controllers (ADCs), and other hardware or software appliances. Such appliances can be distributed or deployed over one or more physical, overlay, or logical networks. Moreover, appliances can be deployed as clusters, which can be formed using layer 2 (L2) and layer 3 (L3) technologies. Clusters can provide high availability, redundancy, and load balancing for flows associated with specific appliances or nodes. A flow can include packets that have the same source and destination information. Thus, packets originating from device A to service node B can all be part of the same flow.

Endpoint groups (EPGs) can also be used in a network for mapping applications to the network. In particular, EPGs can use a grouping of application endpoints in a network to apply connectivity and policy to the group of applications. EPGs can act as a container for groups or collections of applications, or application components, and tiers for implementing forwarding and policy logic. EPGs also allow separation of network policy, security, and forwarding from addressing by instead using logical application boundaries.

Appliances or nodes, as well as clusters, can be implemented in cloud deployments. Cloud deployments can be provided in one or more networks to provision computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, network devices, applications, virtual machines (VMs), services, and so forth. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc. Also, services may include various types of services, such as monitoring services, management services, communication services, data services, bandwidth services, routing services, configuration services, wireless services, architecture services, etc.

The cloud may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. In some cases, the cloud can be include one or more cloud controllers which can help manage and interconnect various elements in the cloud as well as tenants or clients connected to the cloud.

Cloud controllers and/or other cloud devices can be configured for cloud management. These devices can be pre-configured (i.e, come "out of the box") with centralized management, layer 7 (L7) device and application visibility, real time web-based diagnostics, monitoring, reporting, management, and so forth. As such, in some embodiments, the cloud can provide centralized management, visibility, monitoring, diagnostics, reporting, configuration (e.g., wireless, network, device, or protocol configuration), traffic distribution or redistribution, backup, disaster recovery, control, and any other service. In some cases, this can be done without the cost and complexity of specific appliances or overlay management software.

Figure 2:
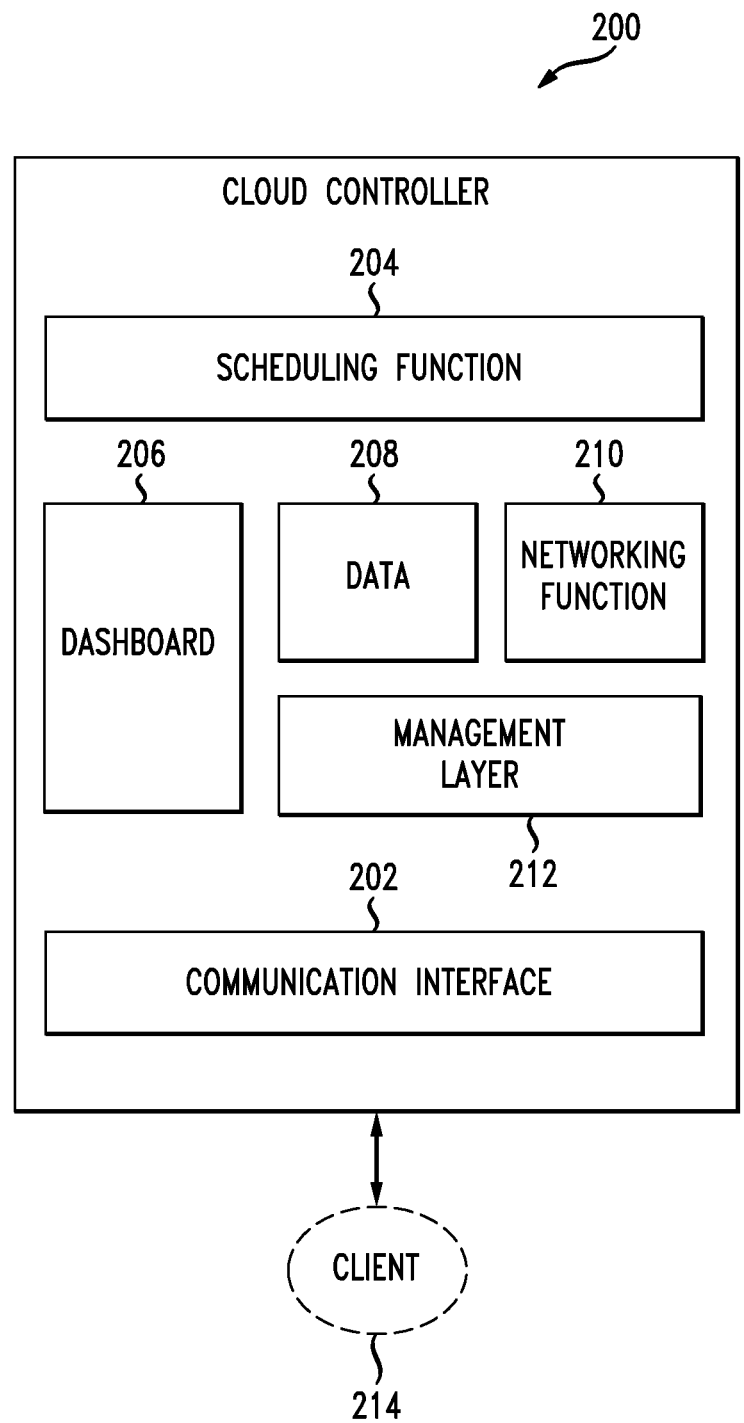
FIG. 2 illustrates a schematic block diagram of an example cloud service management system.
Figure 3:
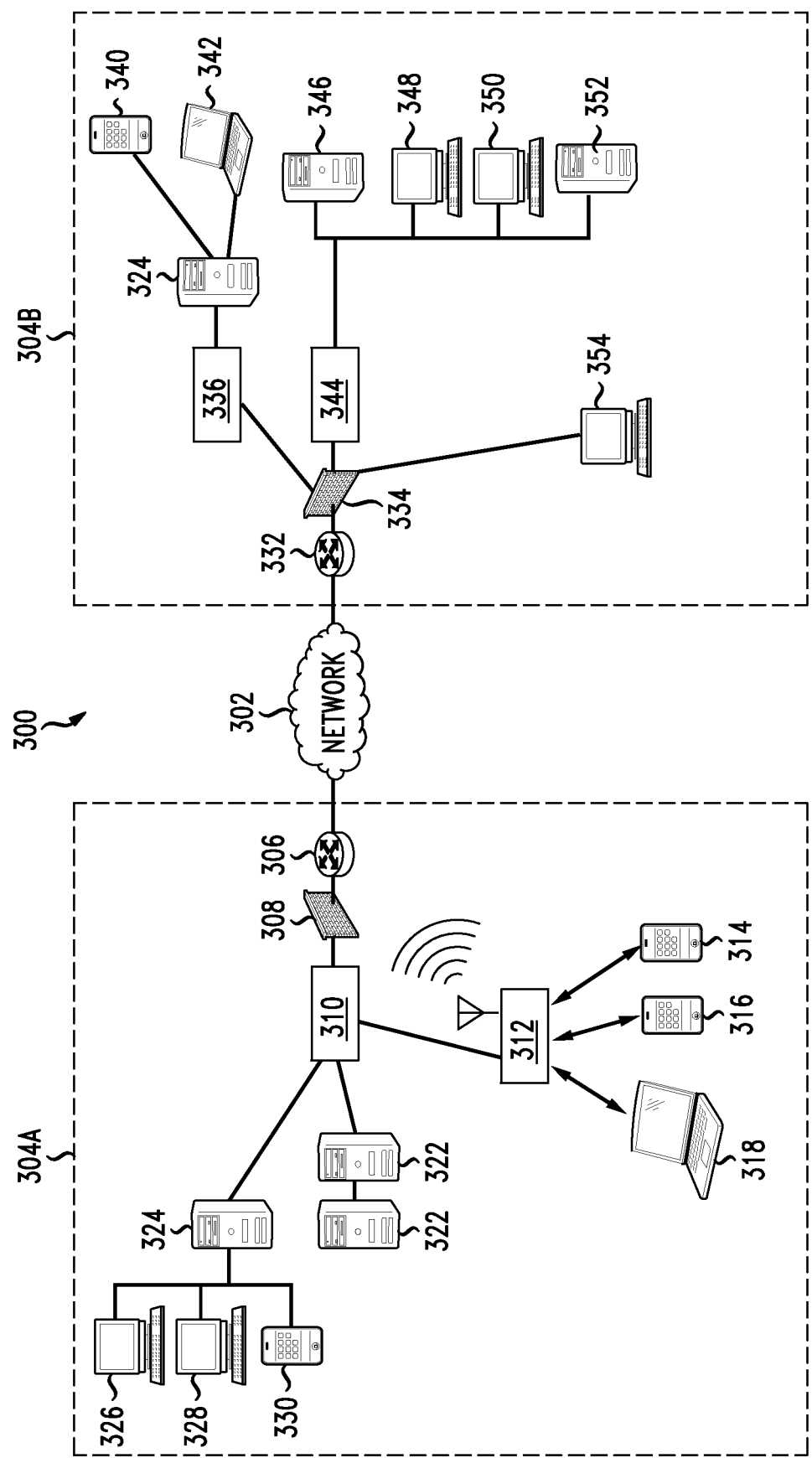
FIG. 3 illustrates an example network infrastructure.
Figure 9:
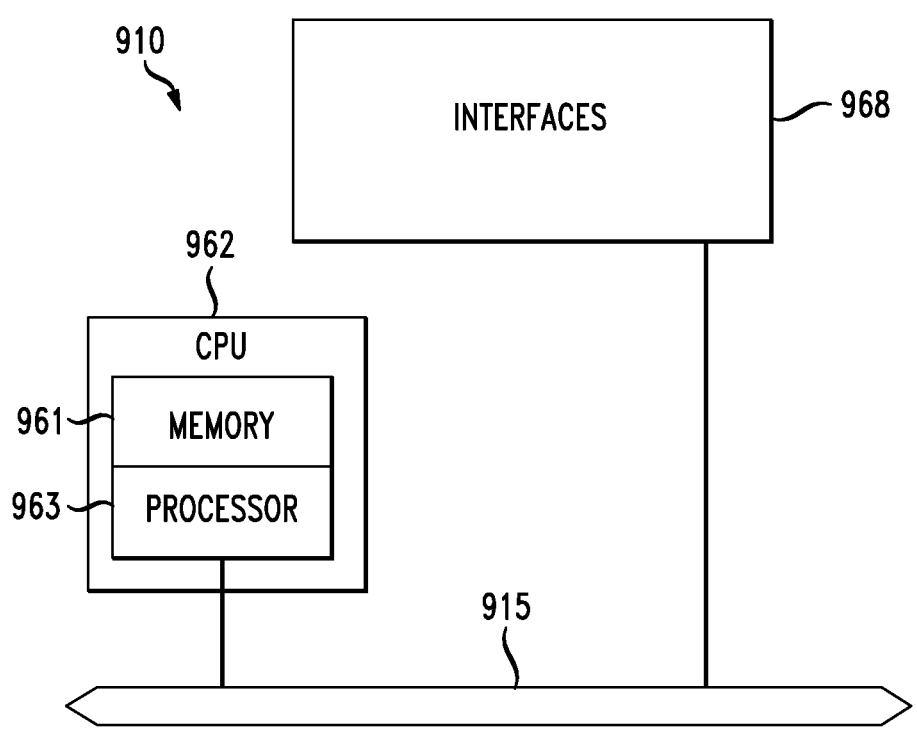
FIG. 9 illustrates an example network device.
Figure 10A:
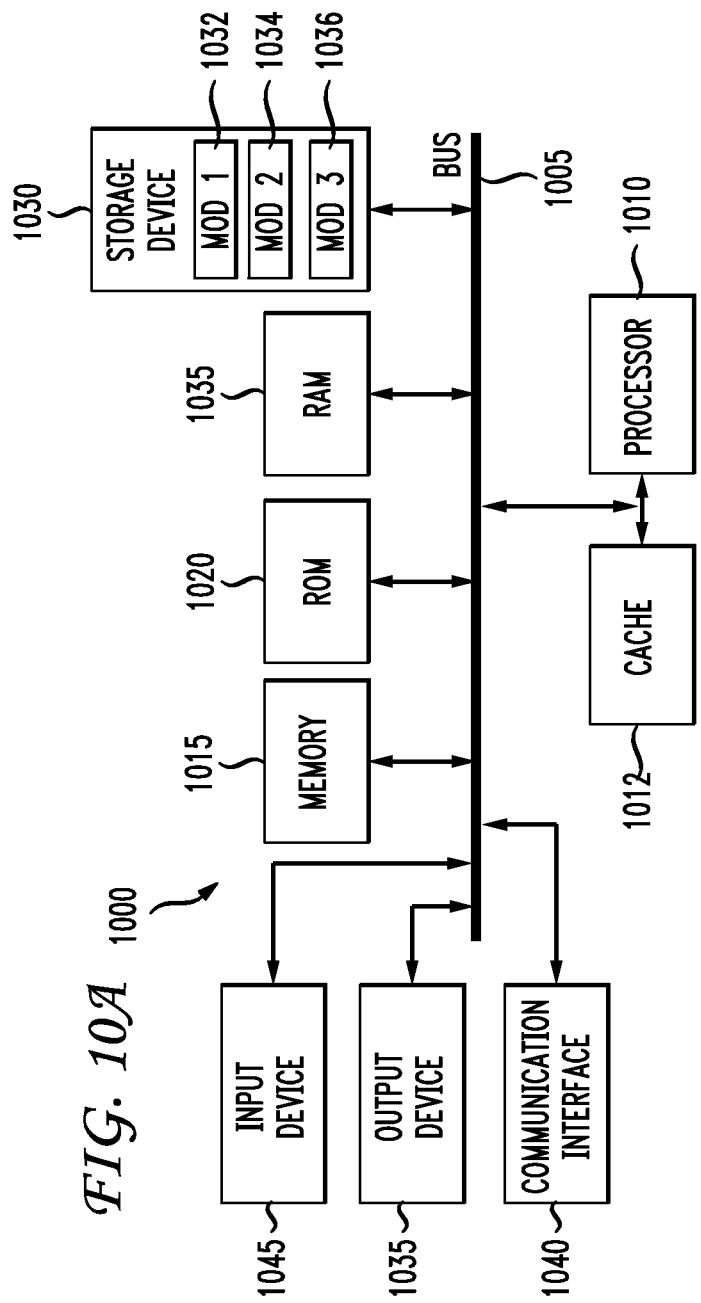
FIGS. 10A and 10B illustrate example system embodiments.
Figure 10B:
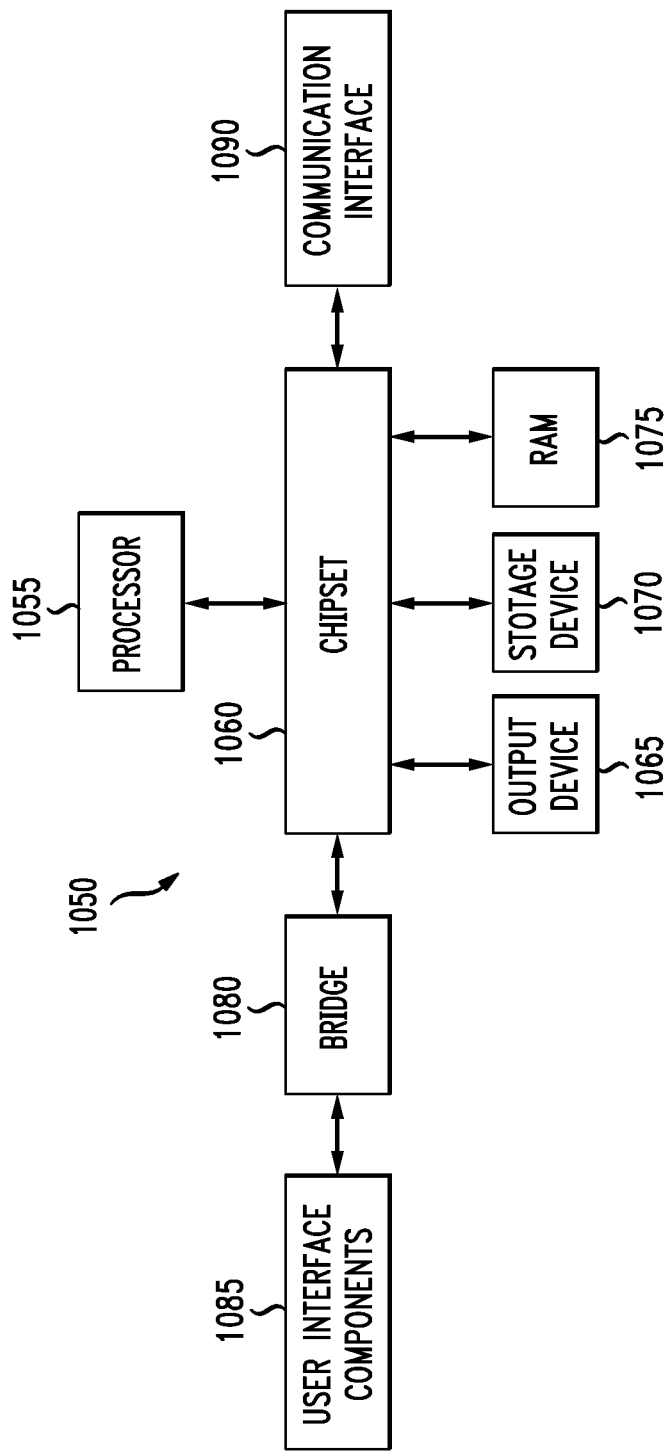

The disclosed technology addresses the need in the art for dynamic and interactive troubleshooting and diagnostic tools. Disclosed are systems, methods, and computer-readable storage media for dynamic troubleshooting workspaces. A description of cloud and network computing environments, as illustrated in FIGS. 1-3, is first disclosed herein. A discussion of dynamic troubleshooting workspaces and interactive tools will then follow. The discussion then concludes with a brief description of example devices, as illustrated in FIGS. 9 and 10A-B. These variations shall be described herein as the various embodiments are set forth. The disclosure now turns to FIG. 1.

FIG. 1 illustrates a schematic block diagram of an example cloud architecture 100 including nodes/devices interconnected by various methods of communication. Cloud 150 can be a public, private, and/or hybrid cloud system. Cloud 150 can include resources, such as one or more Firewalls 197; Load Balancers 193; WAN optimization platforms 195; devices 187, such as switches, routers, intrusion detection systems, Auto VPN systems, or any hardware or software network device; servers 180, such as dynamic host configuration protocol (DHCP), domain naming system (DNS), or storage servers; virtual machines (VMs) 190; controllers 200, such as a cloud controller or a management device; or any other resource.

Cloud resources can be physical, software, virtual, or any combination thereof. For example, a cloud resource can include a server running one or more VMs or storing one or more databases. Moreover, cloud resources can be provisioned based on requests (e.g., client or tenant requests), schedules, triggers, events, signals, messages, alerts, agreements, necessity, or any other factor. For example, the cloud 150 can provision application services, storage services, management services, monitoring services, configuration services, administration services, backup services, disaster recovery services, bandwidth or performance services, intrusion detection services, VPN services, or any type of services to any device, server, network, client, or tenant.

In addition, cloud 150 can handle traffic and/or provision services. For example, cloud 150 can provide configuration services, such as auto VPN, automated deployments, automated wireless configurations, automated policy implementations, and so forth. In some cases, the cloud 150 can collect data about a client or network and generate configuration settings for specific service, device, or networking deployments. For example, the cloud 150 can generate security policies, subnetting and routing schemes, forwarding schemes, NAT settings, VPN settings, and/or any other type of configurations. The cloud 150 can then push or transmit the necessary data and settings to specific devices or components to manage a specific implementation or deployment. For example, the cloud 150 can generate VPN settings, such as IP mappings, port number, and security information, and send the VPN settings to specific, relevant device(s) or component(s) identified by the cloud 150 or otherwise designated. The relevant device(s) or component(s) can then use the VPN settings to establish a VPN tunnel according to the settings. As another example, the cloud 150 can generate and manage network diagnostic tools or graphical user interfaces.

To further illustrate, cloud 150 can provide specific services for client A (110), client B (120), and client C (130). For example, cloud 150 can deploy a network or specific network components, configure links or devices, automate services or functions, or provide any other services for client A (110), client B (120), and client C (130). Other non-limiting example services by cloud 150 can include network administration services, network monitoring services, content filtering services, application control, WAN optimization, firewall services, gateway services, storage services, protocol configuration services, wireless deployment services, and so forth.

To this end, client A (110), client B (120), and client C (130) can connect with cloud 150 through networks 160, 162, and 164, respectively. More specifically, client A (110), client B (120), and client C (130) can each connect with cloud 150 through networks 160, 162, and 164, respectively, in order to access resources from cloud 150, communicate with cloud 150, or receive any services from cloud 150. Networks 160, 162, and 164 can each refer to a public network, such as the Internet; a private network, such as a LAN; a combination of networks; or any other network, such as a VPN or an overlay network.

Moreover, client A (110), client B (120), and client C (130) can each include one or more networks. For example, (110), client B (120), and client C (130) can each include one or more LANs and VLANs. In some cases, a client can represent one branch network, such as a LAN, or multiple branch networks, such as multiple remote networks. For example, client A (110) can represent a single LAN network or branch, or multiple branches or networks, such as a branch building or office network in Los Angeles and another branch building or office network in New York. If a client includes multiple branches or networks, the multiple branches or networks can each have a designated connection to the cloud 150. For example, each branch or network can maintain a tunnel to the cloud 150. Alternatively, all branches or networks for a specific client can connect to the cloud 150 via one or more specific branches or networks. For example, traffic for the different branches or networks of a client can be routed through one or more specific branches or networks. Further, client A (110), client B (120), and client C (130) can each include one or more routers, switches, appliances, client devices, VMs, or any other devices.

Each client can also maintain links between branches. For example, client A can have two branches, and the branches can maintain a link between each other. Thus, in some cases, branches can maintain a tunnel between each other, such as a VPN tunnel. Moreover, the link or tunnel between branches can be generated and/or maintained by the cloud 150. For example, the cloud 150 can collect network and address settings for each branch and use those settings to establish a tunnel between branches. In some cases, the branches can use a respective tunnel between the respective branch and the cloud 150 to establish the tunnel between branches. For example, branch 1 can communicate with cloud 150 through a tunnel between branch 1 and cloud 150 to obtain the settings for establishing a tunnel between branch 1 and branch 2. Branch 2 can similarly communicate with cloud 150 through a tunnel between branch 2 and cloud 150 to obtain the settings for the tunnel between branch 1 and branch 2.

In some cases, cloud 150 can maintain information about each client network, in order to provide or support specific services for each client, such as security or VPN services. Cloud 150 can also maintain one or more links or tunnels to client A (110), client B (120), and/or client C (130). For example, cloud 150 can maintain a VPN tunnel to one or more devices in client A's network. In some cases, cloud 150 can configure the VPN tunnel for a client, maintain the VPN tunnel, or automatically update or establish any link or tunnel to the client or any devices of the client.

The cloud 150 can also monitor device and network health and status information for client A (110), client B (120), and client C (130). To this end, client A (110), client B (120), and client C (130) can synchronize information with cloud 150. Cloud 150 can also manage and deploy services for client A (110), client B (120), and client C (130). For example, cloud 150 can collect network information about client A and generate network and device settings to automatically deploy a service for client A. In addition, cloud 150 can update device, network, and service settings for client A (110), client B (120), and client C (130).

Those skilled in the art will understand that the cloud architecture 150 can include any number of nodes, devices, links, networks, or components. In fact, embodiments with different numbers and/or types of clients, networks, nodes, cloud components, servers, software components, devices, virtual or physical resources, configurations, topologies, services, appliances, deployments, or network devices are also contemplated herein. Further, cloud 150 can include any number or type of resources, which can be accessed and utilized by clients or tenants. The illustration and examples provided herein are for clarity and simplicity.

Moreover, as far as communications, packets (e.g., traffic and/or messages) can be exchanged among the various nodes and networks in the cloud architecture 100 using specific network protocols. In particular, packets can be exchanged using wired protocols, wireless protocols, security protocols, OSI-Layer specific protocols, or any other protocols. Some non-limiting examples of protocols can include protocols from the Internet Protocol Suite, such as TCP/IP; OSI (Open Systems Interconnection) protocols, such as L1-L7 protocols; routing protocols, such as RIP, IGP, BGP, STP, ARP, OSPF, EIGRP, NAT; or any other protocols or standards, such as HTTP, SSH, SSL, RTP, FTP, SMTP, POP, PPP, NNTP, IMAP, Telnet, SSL, SFTP, WIFI, Bluetooth, VTP, ISL, IEEE 802 standards, L2TP, IPSec, etc. In addition, various hardware and software components or devices can be implemented to facilitate communications both within a network and between networks. For example, switches, hubs, routers, access points (APs), antennas, network interface cards (NICs), modules, cables, firewalls, servers, repeaters, sensors, etc.

FIG. 2 illustrates a schematic block diagram of an example cloud controller 200. The cloud controller 200 can serve as a cloud service management system for the cloud 150. In particular, the cloud controller 200 can manage cloud operations, client communications, service provisioning, network configuration and monitoring, etc. For example, the cloud controller 200 can manage cloud service provisioning, such as cloud storage, media, streaming, security, or administration services. In some embodiments, the cloud controller 200 can manage VMs; networks, such as client networks or software-defined networks (SDNs); service provisioning; etc.

The cloud controller 200 can include several subcomponents, such as a scheduling function 204, a dashboard 206, data 208, a networking function 210, a management layer 212, and a communications interface 202. The various subcomponents can be implemented as hardware and/or software components. Moreover, although FIG. 2 illustrates one example configuration of the various components of the cloud controller 200, those of skill in the art will understand that the components can be configured in a number of different ways and can include any other type and number of components. For example, the networking function 210 and management layer 212 can belong to one software module or multiple separate modules. Other modules can be combined or further divided up into more subcomponents.

The scheduling function 204 can manage scheduling of procedures, events, or communications. For example, the scheduling function 204 can schedule when resources should be allocated from the cloud 150. As another example, the scheduling function 204 can schedule when specific instructions or commands should be transmitted to the client 214. In some cases, the scheduling function 204 can provide scheduling for operations performed or executed by the various subcomponents of the cloud controller 200. The scheduling function 204 can also schedule resource slots, virtual machines, bandwidth, device activity, status changes, nodes, updates, etc.

The dashboard 206 can provide a frontend where clients can access or consume cloud services. For example, the dashboard 206 can provide a web-based frontend where clients can configure client devices or networks that are cloud-managed, provide client preferences, specify policies, enter data, upload statistics, configure interactions or operations, etc. In some cases, the dashboard 206 can provide visibility information, such as views of client networks or devices. For example, the dashboard 206 can provide a view of the status or conditions of the client's network, the operations taking place, services, performance, a topology or layout, specific network devices, protocols implemented, running processes, errors, notifications, alerts, network structure, ongoing communications, data analysis, etc.

In some cases, the dashboard 206 can provide a graphical user interface (GUI) for the client 214 to monitor the client network, the devices, statistics, errors, notifications, etc., and even make modifications or setting changes through the GUI. The GUI can depict charts, lists, tables, tiles, network trees, maps, topologies, symbols, structures, or any graphical object or element. In addition, the GUI can use color, font, shapes, or any other characteristics to depict scores, alerts, or conditions. In some cases, the dashboard 206 can also handle user or client requests. For example, the client 214 can enter a service request through the dashboard 206.

The data 208 can include any data or information, such as management data, statistics, settings, preferences, profile data, logs, notifications, attributes, configuration parameters, client information, network information, and so forth. For example, the cloud controller 200 can collect network statistics from the client 214 and store the statistics as part of the data 208. In some cases, the data 208 can include performance and/or configuration information. This way, the cloud controller 200 can use the data 208 to perform management or service operations for the client 214. The data 208 can be stored on a storage or memory device on the cloud controller 200, a separate storage device connected to the cloud controller 200, or a remote storage device in communication with the cloud controller 200.

The networking function 210 can perform networking calculations, such as network addressing, or networking service or operations, such as auto VPN configuration or traffic routing. For example, the networking function 210 can perform filtering functions, switching functions, failover functions, high availability functions, network or device deployment functions, resource allocation functions, messaging functions, traffic analysis functions, port configuration functions, mapping functions, packet manipulation functions, path calculation functions, loop detection, cost calculation, error detection, or otherwise manipulate data or networking devices. In some embodiments, the networking function 210 can handle networking requests from other networks or devices and establish links between devices. In other embodiments, the networking function 210 can perform queuing, messaging, or protocol operations.

The management layer 212 can include logic to perform management operations. For example, the management layer 212 can include the logic to allow the various components of the cloud controller 200 to interface and work together. The management layer 212 can also include the logic, functions, software, and procedure to allow the cloud controller 200 perform monitoring, management, control, and administration operations of other devices, the cloud 150, the client 214, applications in the cloud 150, services provided to the client 214, or any other component or procedure. The management layer 212 can include the logic to operate the cloud controller 200 and perform particular services configured on the cloud controller 200.

Moreover, the management layer 212 can initiate, enable, or launch other instances in the cloud controller 200 and/or the cloud 150. In some embodiments, the management layer 212 can also provide authentication and security services for the cloud 150, the client 214, the controller 214, and/or any other device or component. Further, the management layer 212 can manage nodes, resources, VMs, settings, policies, protocols, communications, etc. In some embodiments, the management layer 212 and the networking function 210 can be part of the same module. However, in other embodiments, the management layer 212 and networking function 210 can be separate layers and/or modules.

The communications interface 202 allows the cloud controller 200 to communicate with the client 214, as well as any other device or network. The communications interface 202 can be a network interface card (NIC), and can include wired and/or wireless capabilities. The communications interface 202 allows the cloud controller 200 to send and receive data from other devices and networks. In some embodiments, the cloud controller 200 can include multiple communications interfaces for redundancy or failover. For example, the cloud controller 200 can include dual NICs for connection redundancy.

FIG. 3 illustrates an example network environment 300. The network environment can include networks 304A and 304B. Networks 304A and 304B can include one or more local area network (LAN), virtual LANs, wireless networks, etc. Moreover, networks 304A and 304B can be interconnected by network 302. Network 302 can include a private network, such as a LAN, and/or a public network, such as the Internet.

Networks 304A and 304B can include various devices 314-318, 326-330, 338-342, 346-352, and 354, such as servers and client devices, interconnected via network devices 308-310, 312, 332-336, and 344, such as routers, firewalls, switches, and so forth. Each of the networks 304A and 304B can also include one or more physical and/or logical network segments. For example, networks 304A and 304B can be segmented into VLANs in order to separate traffic within the networks 304A and 304B.

In some embodiments, networks 304A and 304B can also include one or more network services, such as firewall services, content filtering services, application security services, web security services, bandwidth services, VPN services, web services, database services, remote access services, Internet services, and so forth. Moreover, networks 304A and 304B can include one or more virtual devices or services, such as virtual machines and virtual routing services.

Figure 4A:
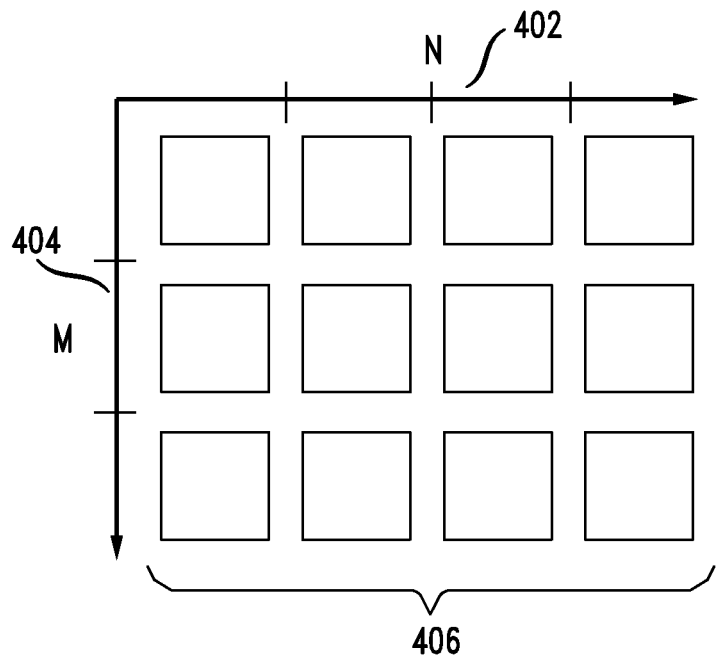
FIG. 4A illustrates a diagram of an example interface grid for creating interface tiles.

FIG. 4A illustrates a diagram of an example interface grid for creating interface tiles. The interface grid can include a horizontal N axis 402 and a vertical M axis 404. The interface grid can also include grid cells 406 which reside at different points within the N axis 402 and the M axis 404. In some cases, the number and size of the grid cells 406 can vary based on a screen resolution and/or any other display or screen parameters or preferences.

Figure 4B:
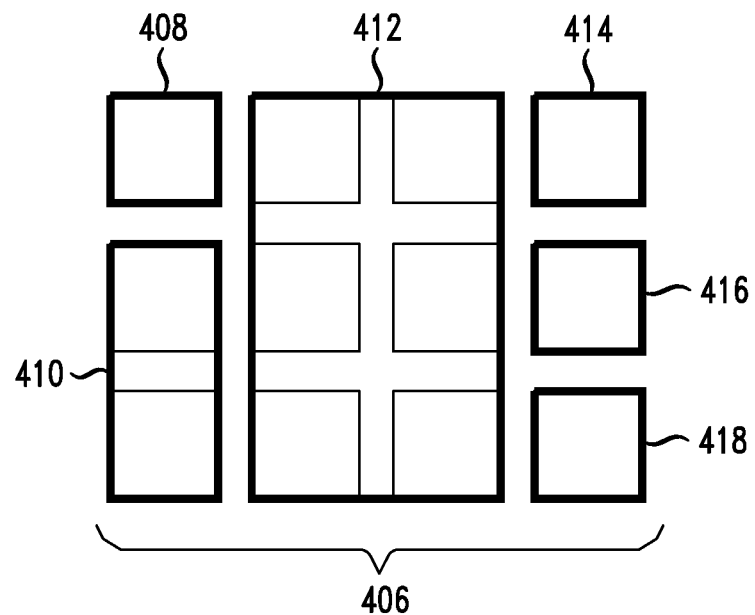
FIG. 4B illustrates a diagram of example interface tiles created from an interface grid.

Referring to FIG. 4B, tiles 408-418 can be snapped to one or more specific grid cells 406. Moreover, the size of one or more tiles can vary. For example, tiles 408 and 414-418 can be snapped to a single grid cell from the grid cells 406, tile 410 can be snapped to two grid cells, and tile 412 can be snapped to six grid cells. As one of ordinary skill in the art will readily recognize, other tile sizes are also contemplated herein.

In some embodiments, the tiles 408-418 can be interface components which present an informational view of network elements or objects, for example. Thus, the interface components can be sized according to grid cells 406.

Figure 4C:
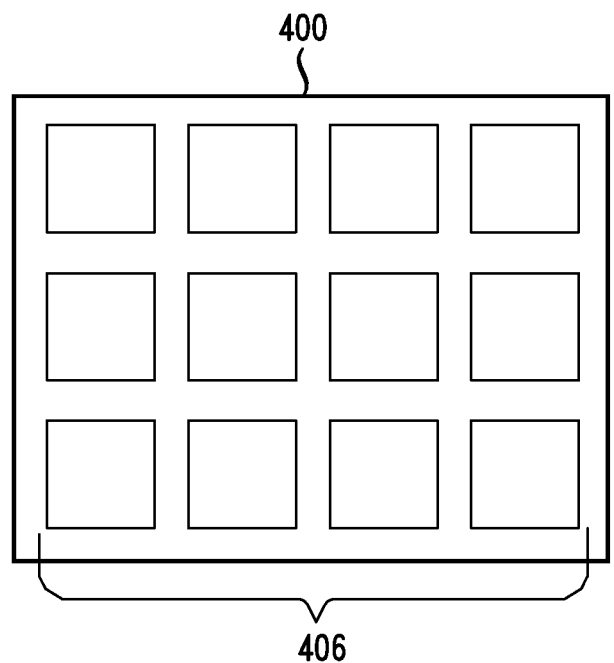
FIG. 4C illustrates a diagram of an example workspace.
Figure 4D:
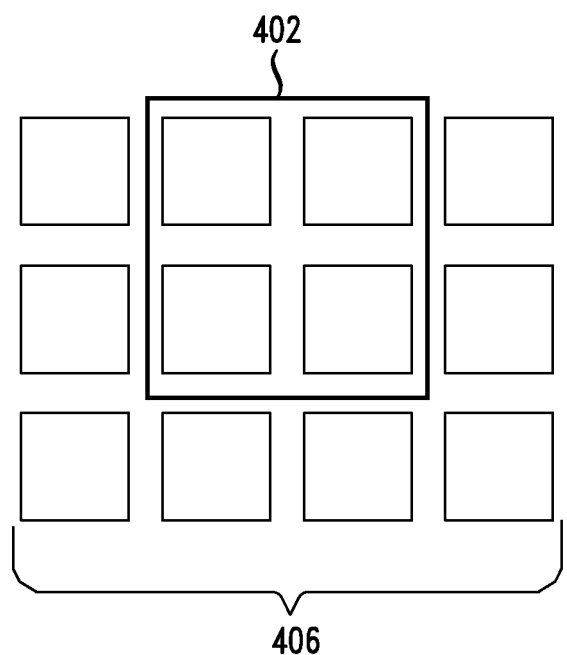
FIGS. 4D and 4E illustrate diagrams of example tiles snapped to a workspace.
Figure 4E:
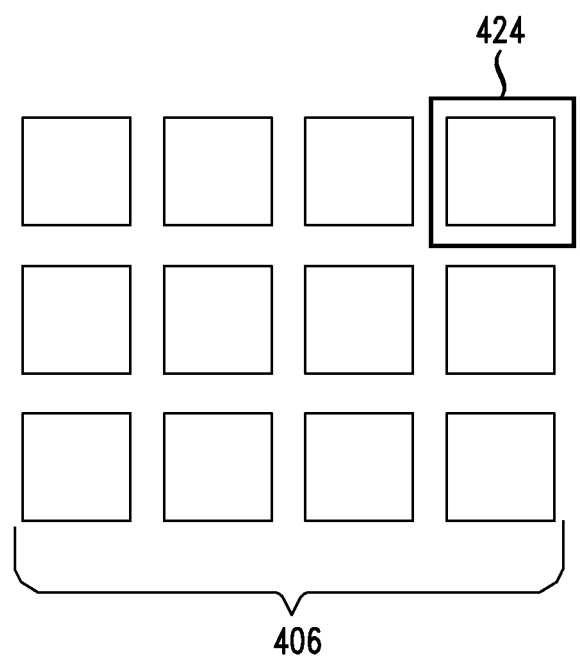

Referring to FIGS. 4C-E, the combined grid cells 406 can make-up a workspace 400. The workspace 400 can include tiles 402 and 424 within the workspace 400. The tiles 402 and 424 can be snapped to one or more grid cells 406, as previously explained. Moreover, the tiles 402 and 424 can vary in size. For example, tile 402 can be snapped to four grid cells within the workspace 400. On the other hand, tile 424 can be snapped to one grid cell within the workspace 400. Further, the workspace 400 can include one or more tiles. In some cases, the entire workspace 400 can be divided into tiles by snapping every grid cell 406 to a tile.

In some cases, the tiles 402 and 424 can include objects and information, such as categories of objects (e.g., servers). Moreover, the size of the tiles 402 and 424 can vary based on the objects and/or information contained within the tiles. For example, as a tile includes more information or objects, it can increase in size (e.g., use more grid cells) to accommodate the additional information or objects.

Figure 5B:
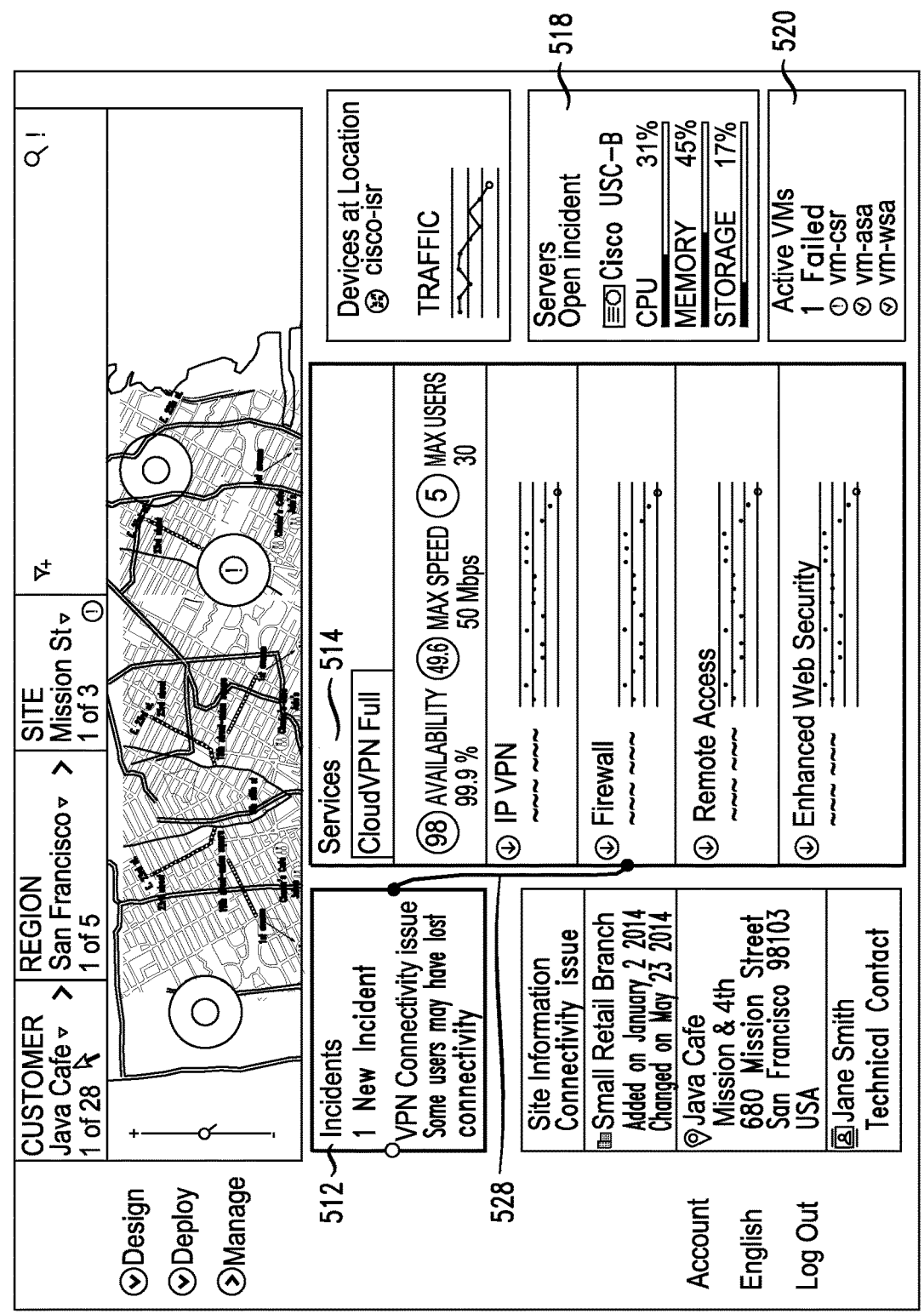

FIGS. 5A and 5B illustrate example workspaces in a graphical user interface. Referring to FIG. 5A, workspace 500 can include context objects 502-506. Each of the context objects 502-506 can serve as a filter to define the specific context for the workspace 500. For example, the context objects 502-506 can provide a taxonomy or a hierarchical context for the information and components presented by the workspace 500, including tiles 512-522 and/or secondary context 510. The workspace 500 can also include an object 508 for adding context objects to the workspace 500, which can further refine or filter the information and components presented by the workspace 500.

The workspace 500 can include a secondary context 510 with location information associated with the context objects 502-506. In some cases, the secondary context 510 can include a map illustrating the relevant geographic area associated with the context objects 502-506 and identifying any relevant objects, such as networks, devices, clients, or services associated with the context objects 502-506. The workspace 500 can also include navigation objects 524, which can represent possible navigation(s) to other areas of an example application.

The workspace 500 can also include interface components 512-522. In some cases, the interface components 512-522 can be tiles or tile clusters. Each of the interface components 512-522 can represent one or more services, devices, networks, events, appliances, logs, network informational views, or network objects associated with the context objects 502-506. For example, the interface components 512-522 can represent one or more incidents, such as errors or failures; one or more locations, such as branches or networks; one or more appliances, such as virtual machines; one or more devices, such as servers, routers, virtual devices, etc.; one or more services, such as a cloud service, a VPN service, a firewall service, a remote access service, a web security service, a bandwidth service, an intrusion detection service, a load balancing service, or any other network and/or virtual service.

As previously mentioned, the interface components 512-522 can be associated with the context objects 502-506. In some cases, the context objects 502-506 can provide the context defining the content or objects associated with the interface components 512-522. For example, assume the context objects 502-506 represent the site "Mission Street" for the customer "Java Café" in the region "San Francisco." The context for the interface components 512-522 can thus be "Mission Street" site for "Java Café" in "San Francisco." Accordingly, the interface components 512-522 can represent one or more incidents, services, devices, informational views, appliances, etc., for the "Mission Street" site for "Java Café" in "San Francisco." To illustrate, the services interface component 514 can present the various services for the "Mission Street" site for "Java Café" in "San Francisco." Similarly, the incidents tile 512 can present any incidents at the "Mission Street" site for "Java Café" in "San Francisco." The devices tile 516, servers tile 518, and VMs the 520 can respectively present devices, servers and VMs at the "Mission Street" site for "Java Café" in "San Francisco."

Referring to FIG. 5B, two or more of the interface components 512-522 can be connected or linked to generate new or updated workspaces and/or interface objects. For example, in workspace 526, interface components 512 and 514 can be connected or linked via link 528. In some cases, workspace 526 can have additional connected components via additional links or connections. Link 528 can connect interface components in order to establish a relationship or context based on the connected interface components. Workspace 526 can represent a state of workspace 500 based on the link 528.

In some cases, the link 528 can trigger a new, dynamic workspace, such as workspace 600 described below with reference to FIG. 6A. The new workspace 600 can be based on the context or relationship created by the link 528 between the connected interface components 512 and 514.

Interface components 512-522 can be connected or linked at specific areas, points, or anchors. For example, link 528 can connect interface components 512 and 514 at specific anchor points within the particular interface components 512 and 514. Other types of connections between interface components, including graphical and textual connections, are also contemplated herein.

The interface components 512-522 can be connected in response to a user input or a system instruction. For example, interface components 512 and 514 can be selected by a user to form the link 528 between the interface components 512 and 514. In some cases, a user can select an anchor point on an interface component in the workspace 500, such as interface component 512, and an anchor point on another interface component in the workspace 500, such as interface component 514, to connect those two interface components at the anchor points to update the state of workspace 500, as illustrated in workspace 526, to include link 528. Moreover, link 528 can then trigger workspace 600, illustrated in FIG. 6A, which can be based on the link 528 and/or the connected interface components 512 and 514. Alternatively, in some cases, the interface components 512 and 514 can be linked or connected based on a system instruction, as previously mentioned. In some cases, the system instruction can be based on application-level context and/or logic.

Figure 6A:
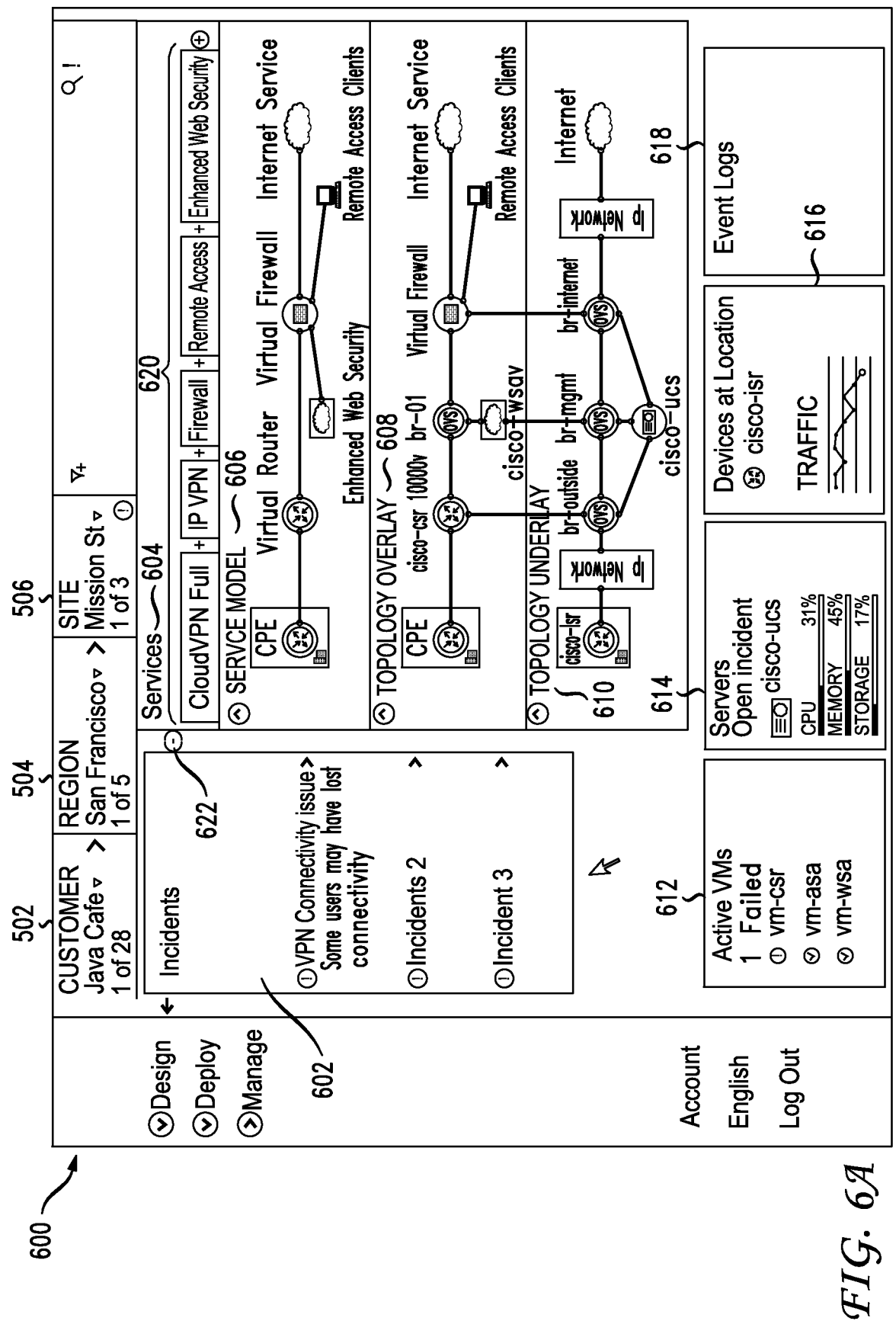
FIGS. 6A-C illustrate a diagram of dynamically-generated workspaces for a network in accordance with an example embodiment.
Figure 6B:
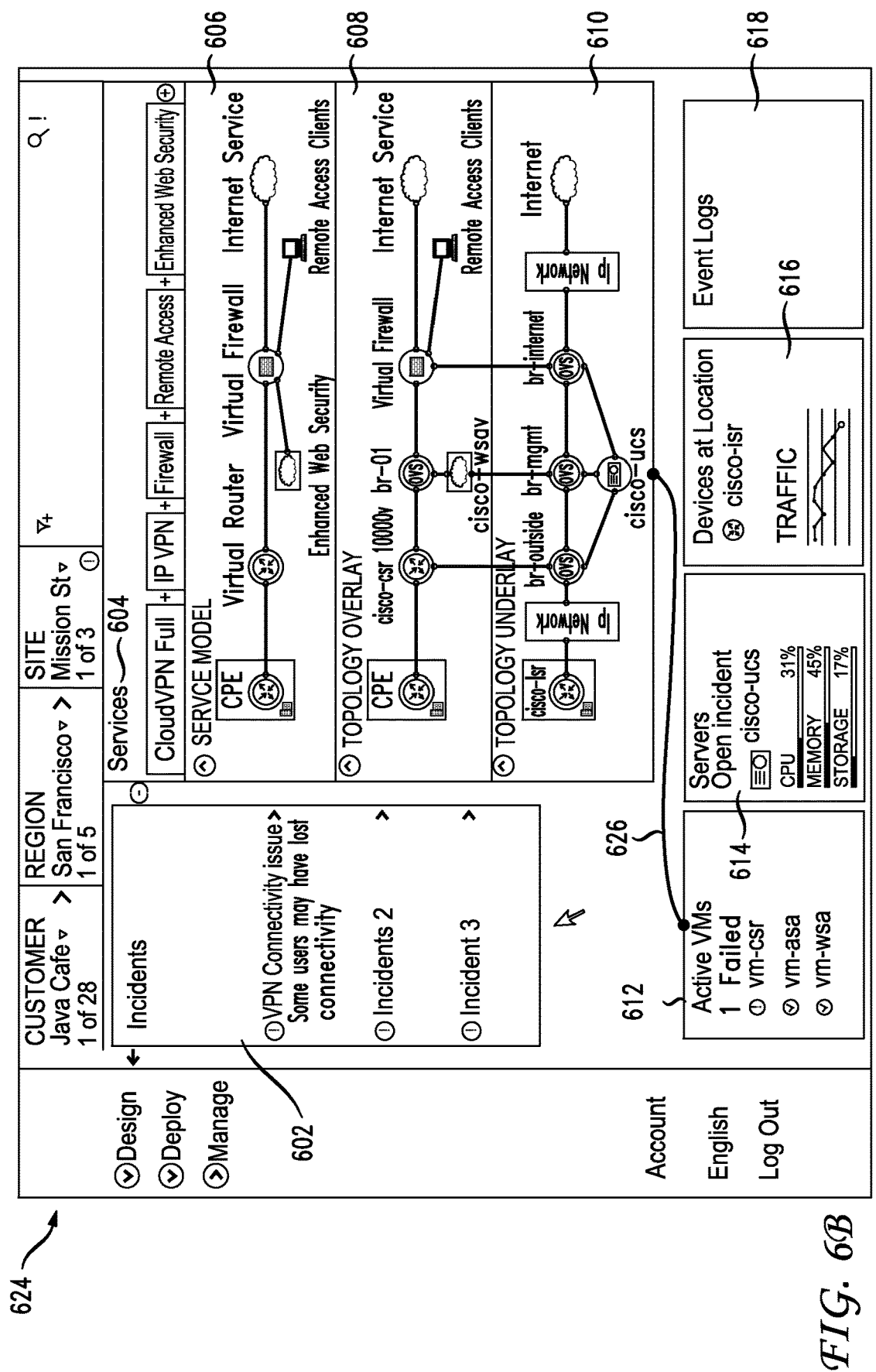
Figure 6C:
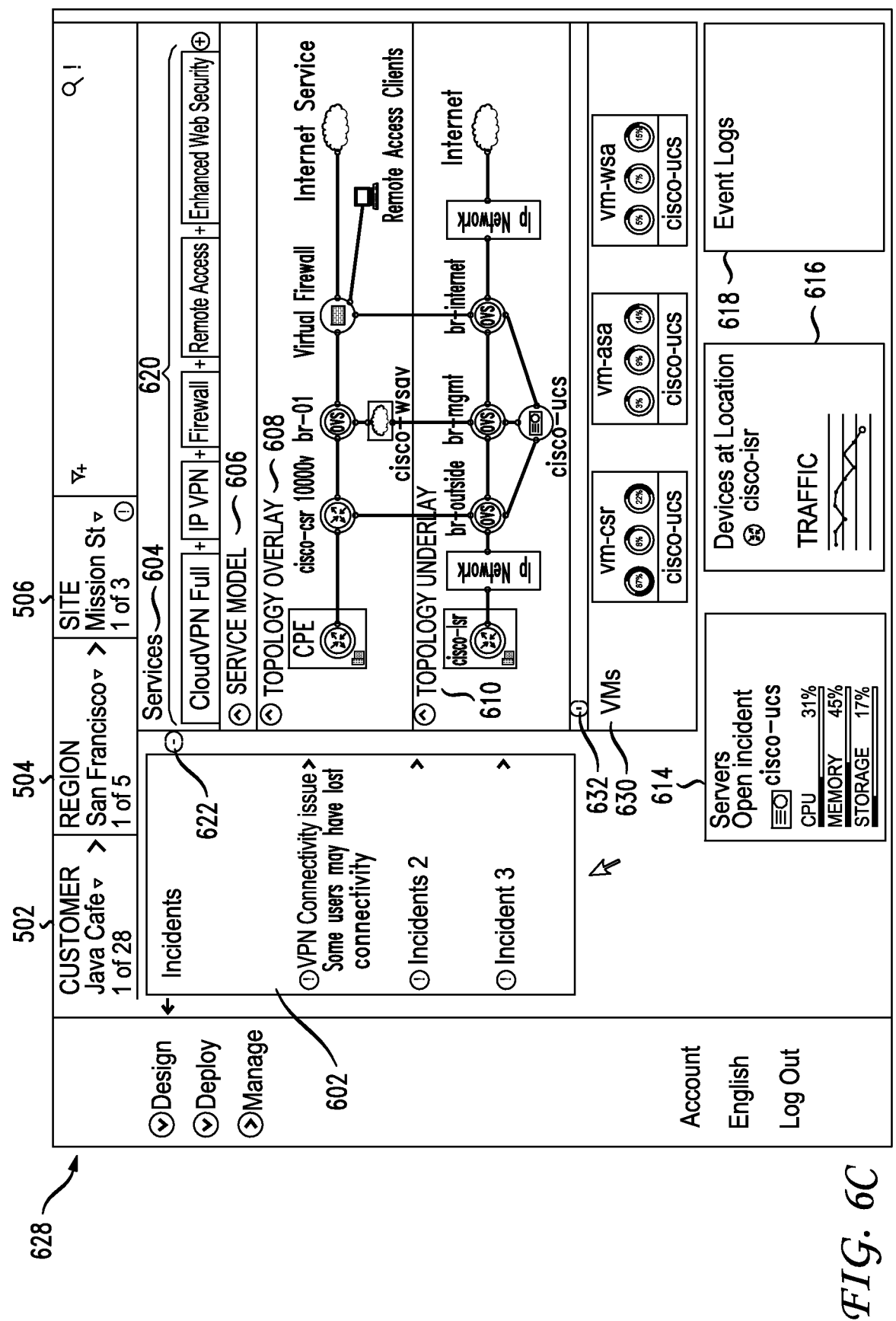

FIGS. 6A-6C illustrate example dynamic troubleshooting workspaces. Referring to FIG. 6A, workspace 600 can be generated by connecting interface components 512 and 514 from workspace 526 of FIG. 5B. In particular, workspace 600 can be generated dynamically in response to the link 528 connecting interface components 512 and 514. The resulting workspace 600 can include interface components 602, 604, and 612-616, which can be generated and presented based on the context or relationship created by the link 528 of interface components 512 and 514. In other words, the interface components 602, 604, and 612-616 can be relevant to the connected interface components 512 and 514, and/or a context associated with those components.

For example, assume interface component 512 represents incidents, such as errors or events, and interface component 514 represents services. When interface components 512 and 514 are connected, the interface components 602, 604, and 612-616 created in workspace 600 can present interface components relevant to, or associated with, the incidents and services represented by interface components 512 and 514. In other words, by connecting an interface component 512 that represents incidents with an interface component 514 that represents services, the user or system can trigger a new workspace having a new context created based on a relationship between the incidents and services respectively represented by the connected interface components 512 and 514.

The interface component 602 in workspace 600 can be an incidents component representing any or all incidents associated with the services represented by the services interface component 514, within the context of the smart context tiles 502-506. The interface component 602 can thus provide details about the incidents associated with the network services in the network, also within the context defined by the smart context tiles 502-506. The incidents and/or associated details can include, for example, any incidents associated with the services from the services interface component 514, and/or any information about such incidents, including a listing of incidents, devices affected, services affected, users affected, network(s) affected, status information, time information, etc.

The services interface component 604 can include a services tab 620 or object listing any of the services in the network context defined by smart context tiles 502-506. Some non-limiting examples of services can include cloud services, VPN services, Firewall services, Remote Access services, Web Security services, network management services, load balancing services, storage services, intrusion detection services, WAN optimization services, wireless services, routing services, or any other network or application services.

Moreover, the services interface component 604 can provide a visualization or representation of the network services, and information about the services, such as the network topology, architecture, infrastructure, a service model, a physical and/or virtual model, one or more network components, etc. Thus, the services interface component 604 can provide one or more views of the services in the network. This can help a user understand how the services are configured, modeled, provisioned, and/or deployed and/or how the various network components are interconnected for the services.

In some cases, the services interface component 604 can include service and network models 606-610. The service and network models 606-610 can provide different views of how the services are configured, modeled or structured, and/or provisioned in the network. Moreover, the service and network models 606-610 can depict a services and network structure, as well as any logical, semantic, and/or physical interconnections.

For example, model 606 can include a service model representation. The service model representation can diagram the services provisioned. In some cases, the service model representation 606 can identify network components or devices provisioning the services, and any interconnections or relationships between the components or devices.

Model 608 can include a representation of an overlay topology of the network. The overlay topology can show the overlay structure and interconnections of components or devices provisioning the services.

Model 610 can provide a representation of the underlay topology. The underlay topology can show the underlay or physical structure and interconnections of components or devices provisioning the services.

Other variations with respect to the number and type of models are also contemplated herein. For example, the models can include a service model and an infrastructure model, with or without an overlay or virtualized representation or model. The amount and type of models can also vary based on the particular architecture, services, or settings.

Moreover, the models 606-610 can include respective objects to depict the relevant information in the model. For example, the models 606-610 can include objects such as virtual switches, routers, or appliances; hardware routers or switches; servers; firewalls; network connections; a cloud, such as cloud 150; virtual machines; or any services or appliances, such as web, security, bandwidth, management, or any other service appliance. The objects can be graphical elements representing associated network components or devices.

Workspace 600 can also include other interface components based on the link 528 between the incidents component 512 and the services component 514. For example, workspace 600 can include a VM interface component 612. The VM interface component 612 can contain objects representing VMs in the network. The VM interface component 612 can also identify any incidents associated with the VMs and/or services provisioned by the VMs. For example, the VM interface component 612 can present VMs in the network and identify any services from the services component 604 provisioned by the associated VMs and/or any incidents from the incidents component 602. The VM interface component 612 can also present information associated with each VM object, such as a name, an address, a status, a location, an alert, a setting, etc. In some cases, the VM interface component 612 can show active VMs, inactive VMs, backup VMs, VMs having errors or incidents, overloaded VMs, or any other VM conditions.

The workspace 600 can also include a servers component 614, which can identify servers associated with the incidents or services associated with the link 528. The workspace 600 can also show a devices component 616, which can identify devices associated with the incidents or services associated with link 528. The workspace 600 can also show an event logs component 618, which can identify relevant logs or events, for example. Other interface components are also contemplated herein, such as a location component, a security component, a user accounts component, etc.

As previously mentioned, the components 602, 604, and 612-618 can include objects which can be graphical elements representing specific components, devices, services, appliances, nodes, incidents, or network items. In some embodiments, the components 602, 604, and 612-618 and/or associated objects can also include additional information or details, such as names, addresses, locations, status information, conditions, state information, statistics, resource consumption measurements or representations (e.g., traffic consumption, memory utilization, etc.), data graphs or tables, links, activity data, connectivity details, etc.

Moreover, the components 602, 604, and 612-618 can be used to create new workspaces or augment an active workspace by linking or connecting two or more of the components 602, 604, and 612-618. For example, two or more of the components 602, 604, and 612-618 can be connected to dynamically create a new context or relationship for a new workspace. To illustrate, referring to FIG. 6B, a connection or link 626 can be established to connect the VMs component 612 to the services component 604. The connection or link 626 can create a relationship or context between the VMs and services represented by components 604 and 612. The connection or link 626 between the VMs component 612 and the services component 604 can then trigger workspace 628 illustrated in FIG. 6C.

Referring to FIG. 6C, workspace 628 can include links 622 and 632 between the incidents component 602, the services component 604, and a new VMs component 630. The new VMs component 630 can be an expanded or detailed version of the VMs interface component 612 from workspace 624. The new VMs component 630 can depict the VMs provisioning services from the services component 604. The new VMs component 630 can also provide information and/or images relating to each specific VM depicted by the new VMs component 630. For example, for each VM, the VMs component 630 can provide a name, location, statistics, activity, incidents, resource utilization (e.g., bandwidth, CPU utilization, storage utilization, etc.), configuration information, status information, and so forth.

Other components can be also be connected and/or disconnected to form new workspaces. For example, the servers component 614, the devices component 616, and/or the event logs component 618 can be connected to one or more of the components 602-604, 614-618, and 630 to generate a new workspace based on the context created by the connected components. Thus, such connections can dynamically result in new relationships, contexts, and workspaces. Connected components can also be disconnected to modify a workspace. For example, the new VMs component 630 can be disconnected from the services component 604 to return to workspace 624. The various components in a workspace can be dynamically linked or connected as needed to dynamically generate new visual workspaces for troubleshooting or analyzing a network for a given context.

Figure 7:
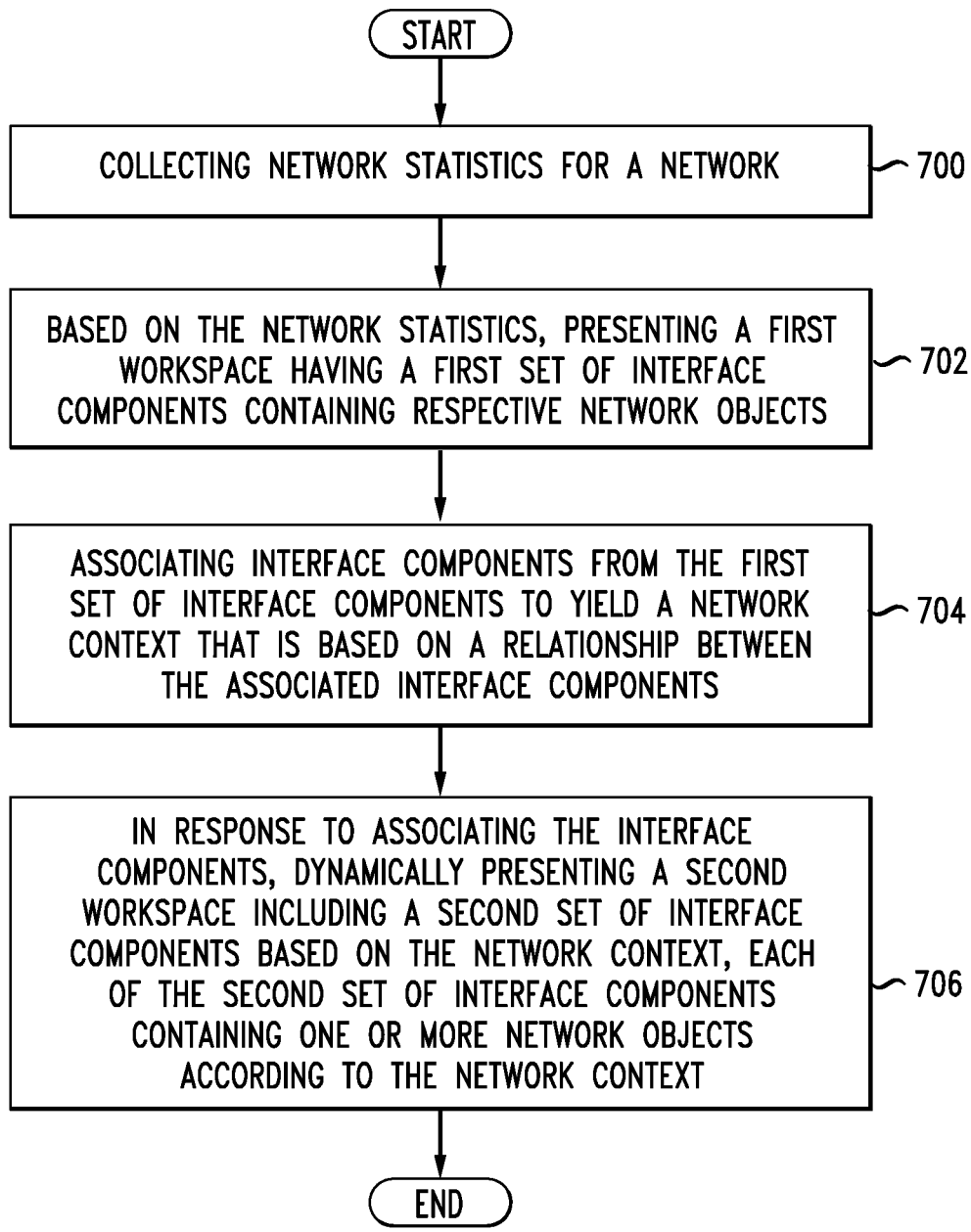
FIGS. 7 and 8 illustrate example method embodiments.
Figure 8:
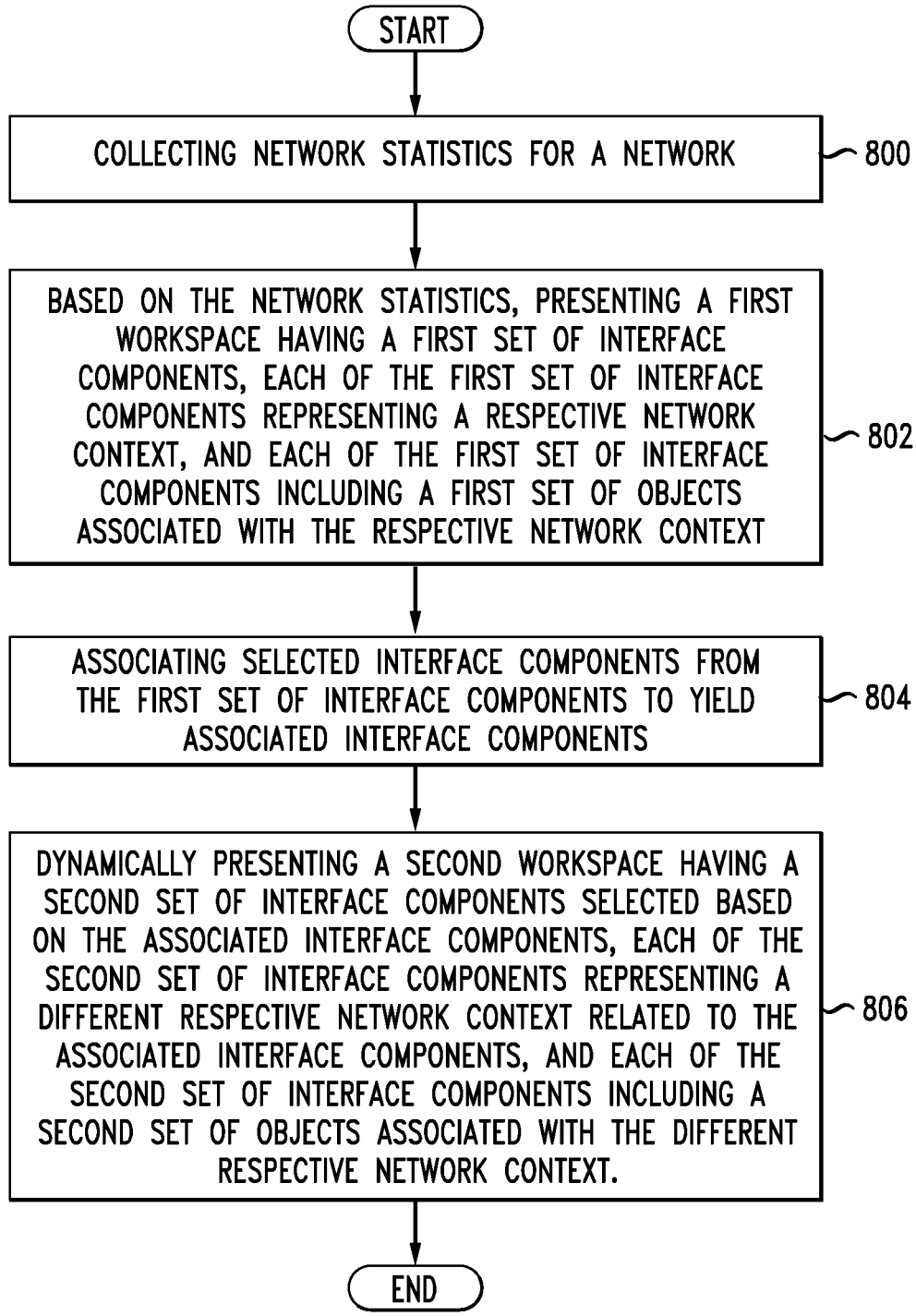

Having disclosed some basic system components and concepts, the disclosure now turns to the example method embodiments shown in FIGS. 7 and 8. For the sake of clarity, the methods are described in terms of a cloud controller 200, as shown in FIG. 2, configured to practice the steps. The steps outlined herein are exemplary and can be implemented in any combination thereof, including combinations that exclude, add, or modify certain steps.

At step 700, cloud controller 200 can collect network statistics for a network. For example, the cloud controller 200 can monitor and collect traffic from the network to identify specific network statistics. The network statistics can include network conditions or incidents, network activity, network and/or resource consumption, network interconnections, network services, network configurations, device information, server information, appliances, events, etc. In some cases, the cloud controller 200 can be configured to collect and monitor specific network statistics in order to ascertain certain desired network details. For example, the cloud controller 200 can specifically collect and monitor network statistics for one or more physical locations, logical locations, servers, networks, services, etc.

At step 702, the cloud controller 200 can present a first workspace having a first set of interface components. The first workspace can be generated based on the network statistics and/or data about the network. For example, the cloud controller 200 can collect network statistics and use the network statistics to generate a graphical user interface (GUI) displaying the first workspace with the first set of interface components.

Each of the first set of interface components can be an informational view of one or more network elements or events, which can include servers, virtual machines (VMs), services, event logs, parameters, topologies, semantics, locations, and so forth. Moreover, the first set of interface components can contain respective network objects. The network objects can be graphical elements. The graphical elements can represent specific network data and/or items associated with the respective interface components. For example, the network objects can be graphical elements representing services, servers, devices, VMs, events (e.g., incidents, errors, status changes, conditions, security events, etc.), physical or logical network segments, locations, logs, topologies, connections, and so forth.

In some embodiments, the interface components can be tiles, such as tiles 408-418 illustrated in FIG. 4B. Thus, the first workspace can include a set of tiles or tile clusters. Each of the tiles can contain similar or related network objects, such as servers, VMs, services, events, topology, event logs, etc. For example, if the first workspace is created for a branch network, the tiles can represent devices, events, services, and topologies associated with the branch network, and the objects contained within the tiles can represent specific devices, events, services, or topologies.

The number of interface components included in the first workspace can vary based on the network statistics, a user input, system instructions, a context, preferences, and so forth. For example, the number of interface components can be selected, increased, decreased or modified by a user. In some cases, a user can limit the number of interface components presented in the first workspace to focus on fewer, more relevant interface components.

At step 704, the cloud controller 200 can associate interface components from the first set of interface components to yield a network context that is based on a relationship between the associated interface components. For example, the cloud controller 200 can link, connect, or associate an interface component representing servers in the network with another interface component representing incidents in the network. This association between interface components can create a relationship between the associated interface components and can represent a network context. In the above example, the network context can be servers and incidents, based on the relationship or association between the servers component and the incidents component. This network context can be used to create a new workspace, as further detailed below, which can include interface objects related or relevant to the network context (servers and incidents), for example.

In some cases, the cloud controller 200 can associate the selected interface components based on a user input or system instructions. For example, a user can click or select a first interface component on the first workspace and a second interface component on the first workspace to create a link, connection, or association between the two selected interface components. In some embodiments, such link, connection, or association can be visual or graphical. For example, the cloud controller 200 can display a line or object connecting the first selected interface component with the second one. In some embodiments, the cloud controller 200 can also connect, link, or associate an object within an interface component with one or more objects within a second interface component, or an interface component with one or more objects within another interface component. For example, the cloud controller 200 can link a component representing network incidents with a VPN service object within a network services component to create a relationship—and thus a network context—based on incidents in the network and a VPN service in the network.

At step 706, the cloud controller 200 can dynamically present a second workspace including a second set of interface components based on the network context. The cloud controller 200 can present and/or generate the second workspace dynamically in response to the associated interface components and/or based on the network context. For example, if a services interface component is linked to an incidents interface component, the cloud controller 200 can dynamically generate the second workspace based on the services and incidents represented by the connected interface components.

The second set of interface components can represent services, servers, incidents, events, appliances, VMs, logs, devices, locations, users, etc. Moreover, each of the second set of interface components can be based on the network context. For example, if the network context is services and incidents, the second set of interface components can be associated with the network services and/or incidents. To illustrate, assume the second set of interface components includes servers and VMs interface components, such servers and VMs interface components can be associated with the network services and/or incidents represented by the associated interface components. For example, the servers interface component can represent servers provisioning the network services and/or having any of the incidents, and the VMs interface component can similarly represent VMs running the network services and/or having any of the incidents.

Further, each of the second set of interface components can contain one or more network objects. The network objects can be related or relevant to the respective interface components. For example, if an interface component represents servers, the objects can represent servers, server statistics, server status information, server events, server configurations, server conditions, and/or otherwise be associated with the servers. In some embodiments, the network objects can be graphical elements representing the objects. For example, the network objects can be visual representations of servers, devices, network models, service models, VMs, events, etc.

The cloud controller 200 can generate or present further workspaces based other connections, associations, or links between interface components. For example, if a user creates a link between an interface component in the second workspace and another interface component in the second workspace, the cloud controller 200 can dynamically generate or present a third workspace which can be based on the network context or relationship created by the association of the linked or connected interface components from the second workspace. Thus, the user can analyze specific views for sets of interface components by connecting or disconnecting the interface components of interest.

FIG. 8 illustrates a second example method embodiment. At step 800, the cloud controller 200 collects network statistics for a network. Based on the network statistics, at step 802 the cloud controller 200 can present a first workspace having a first set of interface components, where each of the first set of interface components can represent a respective network context. The respective network context can include, for example devices, networks, incidents, VMs, events, locations, users, services, etc. Moreover, each of the first set of interface components can include a first set of objects associated with the respective network context. For example, if the respective network context for an interface component is servers, the interface component can include a first set of server objects. The objects can include graphical elements, such as images or visual representations. Moreover, the objects can include data associated with their respective network context, such as object statistics, object conditions, object address information, object names, object status information, resource consumption, etc.

At step 804, the cloud controller 200 can dynamically associate selected interface components from the first set of interface components to yield associated interface components. For example, the cloud controller 200 can associate a services interface component with a servers interface component and an incidents interface component. The association can be based on a user input or a system instruction. For example, the association can be generated based on a user selection of two or more interface components. In some embodiments, users can link or connect two or more interface components via a graphical user interface presented by the cloud controller 200 (e.g., a dashboard) to create the association.

At step 806, the cloud controller 200 can dynamically present a second workspace having a second set of interface components selected based on the associated interface components, where each of the second set of interface components represents a different respective network context related to the associated interface components. The different respective network context can be based on the association between the selected interface components. For example, the different respective network context can be represented by the combination of the associated interface components. Also, each of the second set of interface components can include a second set of objects associated with the different respective network context. For example, the second set of interface components can represent the different respective network context.

In some cases, an interface component from the first set of interface components can represent a same or similar item as an interface component from the second set of interface components. For example, an interface component from the first set of interface components may represent servers while an interface component from the second set of interface components may also represent servers. However, such interface components while representing the same item, may include different objects and/or details based on the different respective network context. For example, if the first workspace and the second workspace both include a servers interface component, the objects and data in each of the servers interface components may still differ. To illustrate, if the different respective network context is modified to include incidents, then the servers interface component in the second workspace can be modified to focus or expand on incidents affecting, or associated with, the servers. In this way, the second workspace can include interface components that represent the same category of items as other interface components in the first workspace but may otherwise include different objects and/or levels of detail.

Example Devices

FIG. 9 illustrates an example network device 910 suitable for high availability and failover. Network device 910 includes a master central processing unit (CPU) 962, interfaces 968, and a bus 915 (e.g., a PCI bus). When acting under the control of appropriate software or firmware, the CPU 962 is responsible for executing packet management, error detection, and/or routing functions. The CPU 962 preferably accomplishes all these functions under the control of software including an operating system and any appropriate applications software. CPU 962 may include one or more processors 963 such as a processor from the Motorola family of microprocessors or the MIPS family of microprocessors. In an alternative embodiment, processor 963 is specially designed hardware for controlling the operations of router 910. In a specific embodiment, a memory 961 (such as non-volatile RAM and/or ROM) also forms part of CPU 962. However, there are many different ways in which memory could be coupled to the system.

The interfaces 968 are typically provided as interface cards (sometimes referred to as "line cards"). Generally, they control the sending and receiving of data packets over the network and sometimes support other peripherals used with the router 910. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 962 to efficiently perform routing computations, network diagnostics, security functions, etc.

Although the system shown in FIG. 9 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 961) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 10A and FIG. 10B illustrate example system embodiments. The more appropriate embodiment will be apparent to those of ordinary skill in the art when practicing the present technology. Persons of ordinary skill in the art will also readily appreciate that other system embodiments are possible.

FIG. 10A illustrates a conventional system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1035, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1035, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates an example computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that example systems 1000 and 1050 can have more than one processor 1010 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

We claim:

1. A method comprising:
    collecting network statistics for a network;
    based on the network statistics, presenting a first workspace having a first plurality of interface components containing respective network objects;
    associating interface components from the first plurality of interface components to yield a network context including an indication of a relationship between the associated interface components, the network context associated with at least a network device and a network event, the indication triggering a second workspace based on the relationship; and
    in response to the triggering of the second workspace, dynamically presenting the second workspace comprising a second plurality of interface components, each of the second plurality of interface components containing one or more network objects according to the network context,
    wherein
        the indication is a link extending between the associated interface components, and
        the first plurality of interface components and the second plurality of interface components comprise tiles.

2. The method of claim 1, wherein the network context is associated with the network device, the network event and at least one of a network service, a network parameter, and a virtual machine.

3. The method of claim 2, wherein the network event comprises a network condition, wherein the network service comprises at least one of a cloud service, a virtual private network service, a firewall service, a remote access service, and a web security service, wherein the network device comprises one of a server, a router, a switch or a firewall, and wherein the network parameter comprises at least one of a location or a configuration.

4. The method of claim 1,
    wherein,
        the collecting of the network statistics is performed via a cloud device, and
        the first workspace and the second workspace are presented via a cloud-based dashboard.

5. The method of claim 1, further comprising:
    dynamically associating selected interface components from the second plurality of interface components based on one of an input or a system instruction, to yield a second set of associated interface components; and
    presenting a third workspace having a third plurality of interface components selected based on the associated interface components, each of the third plurality of interface components representing a second different respective network context related to the second set of associated interface components, and each of the third plurality of interface components comprising a third set of objects associated with the second different respective network context.

6. The method of claim 1, wherein a first component from the second plurality of interface components comprises a service model representation and a second component from the second plurality of interface components comprises a topology representation, the topology representation comprising at least one of an overlay topology and an underlay topology.

7. The method of claim 5, wherein associating the selected interface components comprises visually connecting the selected interface components.

8. A system comprising:
    a processor; and
    a computer-readable storage medium having stored therein instructions which, when executed by the processor, cause the processor to perform operations comprising:
        collecting network statistics for a network;
        based on the network statistics, presenting a first workspace having a first plurality of interface components, each of the first plurality of interface components representing a respective network context associated with at least a network device and a network event, each of the first plurality of interface components comprising a first set of objects associated with the respective network context;
        dynamically associating selected interface components from the first plurality of interface components to yield associated interface components and an indication of a relationship between the associated interface components, the indication triggering a second workspace based on the relationship; and
        in response to the triggering of the second workspace, dynamically presenting the second workspace having a second plurality of interface components, the second plurality of interface components selected based on the associated interface components, each of the second plurality of interface components representing a different respective network context related to the associated interface components, and each of the second plurality of interface components comprising a second set of objects associated with the different respective network context,
    wherein
        the indication is a link extending between the associated interface components from the second plurality of interface components, and the first plurality of interface components and the second plurality of interface components comprise tiles.

9. The system of claim 8, wherein the respective network context is based on the network device and the network event and at least one of a network service, a network parameter, and a virtual machine.

10. The system of claim 9, wherein the network event comprises a network condition, wherein the network service comprises at least one of a cloud service, a virtual private network service, a firewall service, a remote access service, and a web security service, wherein the network device comprises one of a server, a router, a switch or a firewall, and wherein the network parameter comprises at least one of a location or a configuration.

11. The system of claim 8, wherein a first component from the second plurality of interface components comprises a service model representation and a second component from the second plurality of interface components comprises a topology representation, the topology representation comprising at least one of an overlay topology and an underlay topology.

12. The system of claim 8, the operations further comprise:
dynamically associating selected interface components from the second plurality of interface components based on one of an input or a system instruction, to yield a second set of associated interface components; and
presenting a third workspace having a third plurality of interface components selected based on the associated interface components, each of the third plurality of interface components representing a second different respective network context related to the second set of associated interface components, and each of the third plurality of interface components comprising a third set of objects associated with the second different respective network context.

13. The system of claim 8, wherein associating the selected interface components comprises visually connecting the selected interface components.

14. A non-transitory computer-readable storage medium having stored therein instructions which, when executed by a processor, cause the processor to perform operations comprising:
collecting network statistics for a network;
based on the network statistics, presenting a first workspace having a first plurality of interface components, each of the first plurality of interface components representing at least a network device and a network event, each of the first plurality of interface components comprising a first set of objects associated with the network device and the network event;
connecting selected interface components from the first plurality of interface components to yield connected interface components via an indication of a relationship between the connected interface components, the indication triggering a second workspace based on the relationship; and
in response to the triggering of the second workspace, dynamically presenting the second workspace having a second plurality of interface components, the second plurality of interface components, each of the second plurality of interface components representing one or more network services associated with the connected interface components, one or more network devices associated with the connected interface components, one or more network events associated with the connected interface components, and one or more appliances associated with the connected interface components,
wherein
the indication is a link extending between the connected interface components from the second plurality of interface components, and
the first plurality of interface components and the second plurality of interface components comprise tiles.

15. The non-transitory computer-readable storage medium of claim 14,
wherein the connected interface components are associated with the one or more network services associated with the connected interface components, one or more network devices associated with the connected interface components, one or more network events associated with the connected interface components, or one or more appliances associated with the connected interface components.

16. The non-transitory computer-readable storage medium of claim 14, wherein the second plurality of interface components comprises a service model representation and a topology representation, the topology representation comprising at least one of an overlay topology and an underlay topology.

17. The non-transitory computer-readable storage medium of claim 16, storing additional instructions which, when executed by the processor, cause the processor to perform operations further comprising:
connecting selected interface components from the second plurality of interface components based on one of an input or a system instruction to yield a second set of connected interface components; and
dynamically presenting a third workspace having a third plurality of interface components selected based on the second set of connected interface components, each of the third plurality of interface components representing a particular network service associated with the second set of connected interface components.

* * * * *